(12) United States Patent
Hallenstål et al.

(10) Patent No.: US 8,165,574 B2
(45) Date of Patent: Apr. 24, 2012

(54) METHOD AND APPARATUS FOR PROVIDING CIRCUIT SWITCHED DOMAIN SERVICES OVER A PACKET SWITCHED NETWORK

(75) Inventors: Magnus Hallenstål, Täby (SE); Jari Tapio Vikberg, Järna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 531 days.

(21) Appl. No.: 12/522,208

(22) PCT Filed: Jan. 14, 2008

(86) PCT No.: PCT/IB2008/000072
§ 371 (c)(1),
(2), (4) Date: Jul. 6, 2009

(87) PCT Pub. No.: WO2008/087519
PCT Pub. Date: Jul. 24, 2008

(65) Prior Publication Data
US 2010/0075651 A1    Mar. 25, 2010

Related U.S. Application Data

(60) Provisional application No. 60/884,914, filed on Jan. 15, 2007.

(51) Int. Cl.
*H04W 4/00* (2009.01)
*H04W 36/00* (2009.01)
(52) U.S. Cl. ...... 455/418; 455/433; 455/436; 455/435.1

(58) Field of Classification Search ............ 455/433, 455/436, 437, 438, 439, 67.11, 435.1, 435.2; 370/328, 352, 338
See application file for complete search history.

(56) References Cited

U.S. PATENT DOCUMENTS

| | | | | |
|---|---|---|---|---|
| 6,577,620 | B1 * | 6/2003 | Galyas et al. | 370/352 |
| 7,359,373 | B2 * | 4/2008 | Kuusinen et al. | 370/352 |
| 2008/0037515 | A1 * | 2/2008 | Sander | 370/352 |

OTHER PUBLICATIONS

"3GPP TS43.318 v7.0.0 Generic access to 1-14 the A/Gb interface" 3rd Generation Partnership Project (3GPP); Technical Specification, [Online] Nov. 2006—XP002481485 Retrieved from the Internet: URL:http://www.3gpp.org/ftp/Specs/html—1nfo/43318.htm> [retrieved on May 26, 2008] Sections 4.5,6.1.7.3.1, 7.3.2.8.9.2,8.10, 6.11, 8.13.

(Continued)

*Primary Examiner* — Danh Le
*Assistant Examiner* — Nelson Rosario

(57) ABSTRACT

A method of establishing a call to or from a mobile station (MS) operating in a Long Term Evolution (LTE) access network. An interface is established between the MS and a Packet Mobile Switching Center (PMSC), and the call is initiated after the network accepts a service request from the MS for an originating call, or after the MS is notified of a terminating call. The PMSC requests packet-switched domain resources from a Policy and Charging Rules Function (PCRF) and establishes a voice bearer channel with an endpoint in the network when the requested resources are available. The PMSC facilitates bidirectional voice traffic between the MS and the endpoint. The PMSC may also use the PCRF to modify the bearer. The PMSC then signals the MS to modify parameters for the established call.

16 Claims, 18 Drawing Sheets

OTHER PUBLICATIONS

"3rd Generation Partnership Project; Technical Specification Group Services and System Aspects: Policy and charging control architecture; (Release 7), 3GPP TS 23.203" 3rd Generation Partnership Project (3GPP). Technicalspecification (TS), XX, XX, vol. 23.203. No. v7.1.0. Dec. 1, 2006, pp. 1-35, XP002457540 Sections 4.3. 6.1.5. 62.1, 7.2, 7.4 Annex A, 0.2.

3GPP TR23.882 v1.6.1 3GPP System I Architecture Evolution: Report on I Technical Options and Conclusions 3rd Generation Partnership Project (3GPP); Technical Report. [Online] Nov. 2006, XP002481466 Retrieved from the Internet: URL: http://www.3gpp.org/ftp/Specs/html-inf 0/23882.htm> [retrieved May 26, 2008] Sections 4.2, 5, 7.1, 7.5.2.1 1, 7.5.2.2.1, 7.11.1, 7.11.2.1, 7.12.1, 7.12. 2,7.12.3, 7.12.9, Annex H.6.

"Digital cellular telecommunications system (Phase 24+); Enhanced Generic Access Networks (EGAN) study (3GPP TR 43.902 version 7.0.1 Release 7), ETSI TR 143902" ETSI Standards. LIS, vol. 3-61, No. V7.0.1, Oct. 1, 2007, XP014039742 ISSN: 0000-0001 p. 62-p. 117 Section 5.2 GAN Iu Mode.

"3GPP TR23.879 v1.0.0 Study on Circuit Switched (C5) comain services over evolved Packet Switched (PS) access". 3rd Generation Partnership Project (3GPP): Technical Report, [Online] Dec. 2007, XP002481487 Retrieved from the Internet: URL: http://www.3gpp.org/ftp/Specs/html-inf.0/23879.htm> [retrieved on May 26, 2008] Section 5.1 Alternative 1—Evolved MSC p. 8-p. 18.

* cited by examiner

METHOD AND APPARATUS FOR PROVIDING CIRCUIT SWITCHED DOMAIN SERVICES OVER A PACKET SWITCHED NETWORK

CROSS-REFERENCE TO RELATED APPLICATIONS

This application claims the benefit of U.S. Provisional Application No. 60/884,914 filed Jan. 15, 2007, the disclosure of which is incorporated herein by reference.

BACKGROUND OF THE INVENTION

The present invention relates to circuit switched domain services. More particularly, the present invention relates to providing circuit switched (CS) domain services over a packet switched (PS) network.

When introducing LTE (Long Term Evolution)—the next generation radio access in 3GPP—there are only packet bearers available. This means that the wide range of services currently offered within the CS domain can not be used by a terminal using LTE-connectivity, unless the terminal either shifts to another radio access or is equipped with a second transceiver permitting parallel access to the CS-domain present in 2G and 3G networks. Examples of existing services are:

Prepaid
Regularity equipments for identity signaling
Legal interception
0800 calls, free calls
Announcements
Premium number calls
Home Zone
Sound Logo
Call Barrings
MultiSIM
Standardized supplementary services The basic assumption when introducing LTE is that the telecommunication service will be provided by the IMS (IP Multimedia Subsystem) system.

BRIEF SUMMARY OF THE INVENTION

The present invention generally describes, in one embodiment, a method for initiating a mobile originated call. An interface is established between a mobile station and a packet mobile switching center over a packet switched network. Call establishment signaling is initiated after the network accepts the service request from the mobile station. Packet switched domain resources for the call are requested from a Policy and Charging Rules Function. A voice bearer channel is established between the mobile station and an endpoint in the network when the requested resources are available. Bidirectional voice traffic is facilitated between the mobile station and the endpoint.

In one embodiment, a method for initiating a mobile terminated call is described. An interface is established between a mobile station and a packet mobile switching center over a packet switched network. The mobile station is notified of an incoming call. Call setup is initiated. Packet switched domain resources for the incoming call are requested from a Policy and Charging Rules Function. A voice bearer channel is established between the mobile station and an endpoint in the network when the requested resources are available. Bidirectional voice traffic is facilitated between the mobile station and the endpoint.

In another embodiment a call is established. A bearer is modified using a Policy and Charging Rules Function. The mobile station is signaled to modify parameters for the established call.

BRIEF DESCRIPTION OF THE DRAWINGS

In the following section, the invention will be described with reference to exemplary embodiments illustrated in the figures, in which.

DETAILED DESCRIPTION OF THE INVENTION

Figure 1:
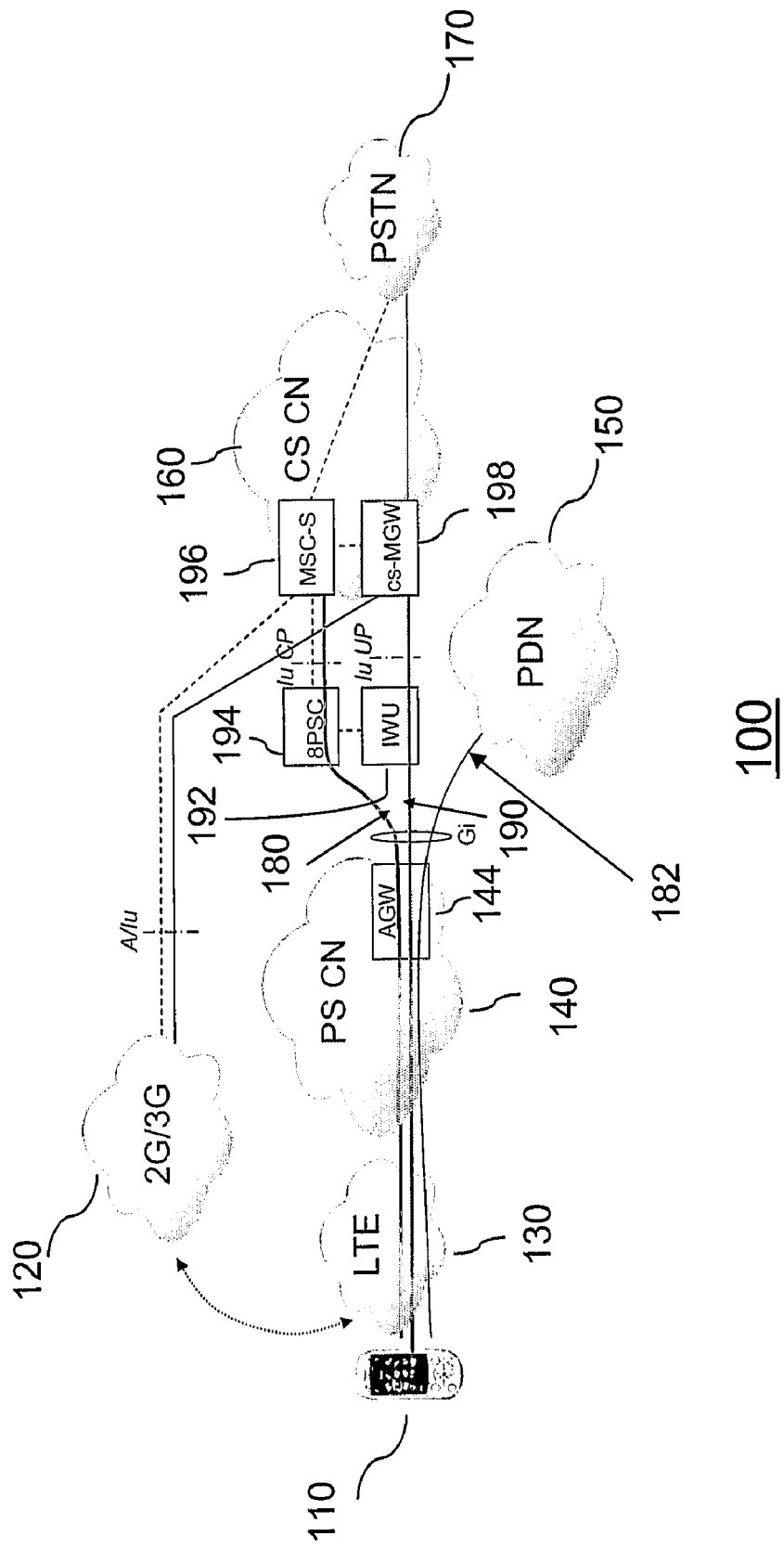
FIG. 1 illustrates a system for providing circuit switched domain services over a packet switched network according to one embodiment of the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

For the purposes of the present invention, the following terms and definitions apply:

24.008 over 3GPP PS network: A service which allows a terminal to make use of the CS call control also over a 3GPP packet switched network.

24.008 over 3GPP PS network Mode: MS mode of operation where the NAS layers communicate through the U8-CSR entity.

24.008 over 3GPP PS network PMSC: The target MSC, or rather PMSC when handing over from CS domain to packet domain entering the 24.008 over 3GPP PS network Mode.

24.008 over 3GPP PS network supporting PMSC: The PMCS that a MS will rove into when entering the 24.008 over 3GPP PS network Mode.

3GPP PS network: Radio and core part of the 3GPP Packet Switched service.

CS Domain: The domain where Circuit Switched services are executed. This domain can be based on IP in the core network, but on the radio access the resources are circuit based.

CS Domain mode: MS mode of operation where the CS related NAS layers communicate through either the GERAN RR or the UTRAN RRC entities, thus operates in the normal CS Domain. When GERAN RR is used, the BSS is connected to the CN using the standardized A-interface. When UTRAN RRC is used, the RNS is connected to the CN using the standardized Iu-CS interface.

Discovery procedure: The process by which the MS discovers which PMSC to Rove into.

Handover: Mobile station engaged in a call moves between 3GPP CS access networks and 24.008 over 3GPP PS networks.

Handover in: mobile station moves from 3GPP CS access network to 24.008 over 3GPP PS network Handover out: mobile station moves from 24.008 over 3GPP PS network to 3GPP CS access network PMSC: Packet MSC, the network function needed to support the 24.008 over 3GPP PS network service.

Supporting PMSC: The PMSC the MS Roves into

Rove in: mobile station reselects from 3GPP CS access network to 24.008 over 3GPP PS network Rove out: mobile station reselects from 24.008 over 3GPP PS network to 3GPP CS access networks Roving: action of re-selection between 3GPP CS access and 24.008 over 3GPP PS network for a mobile station in idle mode Seamless: free from noticeable transitions (i.e. no end-user action is required; speech interruptions are short; service interruptions are short; incoming calls are not missed; packet sessions are maintained; services work identically)

For the purposes of the present invention, the following abbreviations apply:

AMR Adaptive Multi-Rate
AS Access Stratum
BSS Base Station Subsystem
BSSGP Base Station System GPRS Protocol
BSSMAP Base Station System Management Application Part
CC Call Control
CGI Cell Global Identity
CM Connection Management
CN Core Network
CS Circuit Switched
CSR Circuit Switched Resources
CTM Cellular Text Telephone Modem
DNS Domain Name System
DTM Dual Transfer Mode
ETSI European Telecommunications Standards Institute
FQDN Fully Qualified Domain Name
GAD Geographical Area Description
GAN Generic Access Network
GERAN GSM EDGE Radio Access Network
GGSN Gateway GPRS Support Node
GMM/SM GPRS Mobility Management and Session Management
GPRS General Packet Radio Service
GSM Global System for Mobile communications
GSN GPRS Support Node
HLR Home Location Register
HPLMN Home PLMN
HSPA High Speed Packet Access
IETF Internet Engineering Task Force
IMEISV International Mobile station Equipment Identity and Software Version number
IMS IP Multimedia Subsystem
IMSI International Mobile Subscriber Identity
IP Internet Protocol
ISIM IMS Subscriber Identity Module
LA Location Area
LAI Location Area Identity
LLC Logical Link Control
LTE Long Term Evolution
MAC Medium Access Control
MM Mobility Management
MS Mobile Station
MSC Mobile Switching Center
MTP1 Message Transfer Part layer 1
MTP2 Message Transfer Part layer 2
MTP3 Message Transfer Part layer 3
NAS Non-Access Stratum
PDP Packet Data Protocol
PDU Protocol Data Unit
PLMN Public Land Mobile Network
PMSC Packet MSC
PSAP Public Safety Answering Point
NOTE: A PSAP is an emergency services network element that is responsible for answering emergency calls.
PSTN Public Switched Telephone Network
QoS Quality of Service
RA Routing Area
RAC Routing Area Code
RAI Routing Area Identity
RAT Radio Access Technology
RLC Radio Link Control
ROHC Robust Header Compression
RRC Radio Resource Control
RTCP Real Time Control Protocol
RTP Real Time Protocol
SCCP Signaling Connection Control Part
SGSN Serving GPRS Support Node
SIM Subscriber Identity Module
SMLC Serving Mobile Location Center
SMS Short Message Service
SNDCP Sub-Network Dependent Convergence Protocol
SS Signaling Subsystem
TFO Tandem Free Operation
TrFO Transcoder Free Operation
TTY Text Telephone or TeletYpewriter
UDP User Datagram Protocol
UMTS Universal Mobile Telecommunication System VLR Visited Location Register
VPLMN Visited Public Land Mobile Network FIG. 1 illustrates a system 100 for providing circuit switched domain services over a packet switched network. Previously, a mobile station 110 using a long term evolution network radio access 130 needed to access another network, e.g. 2G/3G network 120, in order to use MSC based CS domain services. The present invention allows a mobile station 110 to use the MSC based CS domain services also when on a long term evolution (LTE) network 130, or other packet based accesses is used. This invention description uses Third Generation Partnership Project (3GPP) accesses as example. It should be noted that other access types also is applicable to the invention, for example 3GPP2 and WiMax accesses. This means that all the control plane 180 and user plane 190 information for the CS domain, e.g., circuit switched core network CS CN 160, is tunneled through the 3GPP PS network 140. Services related to public switched telephone network (PSTN) 170 may also be accessed via CS CN 160.

Control plane information 180 is tunneled through packet switched network 140 to network controller 194. Network controller 194 may be a stand-alone unit or may be a component of mobile switching center server (MSC-S) 196. User plane information 190 is tunneled through packet switched network 140 to inter working unit (IWU) 192. IWU 192 may be a stand-alone unit or may be a component of circuit switch domain media gateway (CS-MGW) 198. Network controller 194, MSC-S 196, IWU 192, and CS-MGW 198 are all located in a packet mobile switching center (not shown).

All other possible PS traffic 182 would be transported in the packet data network 150. The figure shows LTE 130 as an example for the 3GPP PS access being used. Other possibilities are e.g. Evolved GSM/GPRS, UMTS/HSPA and WiMax. The LTE example of FIG. 1 also shows Access Gateway (AGW) 144. AGW 144 is the node corresponding to the GGSN in the Evolved GSM/GPRS and UMTS/HSPA cases. In current standards (3GPP 23.401) the AGW consists of a Serving Gateway and a PDN Gateway (Packet Data Network Gateway)

Figure 2:
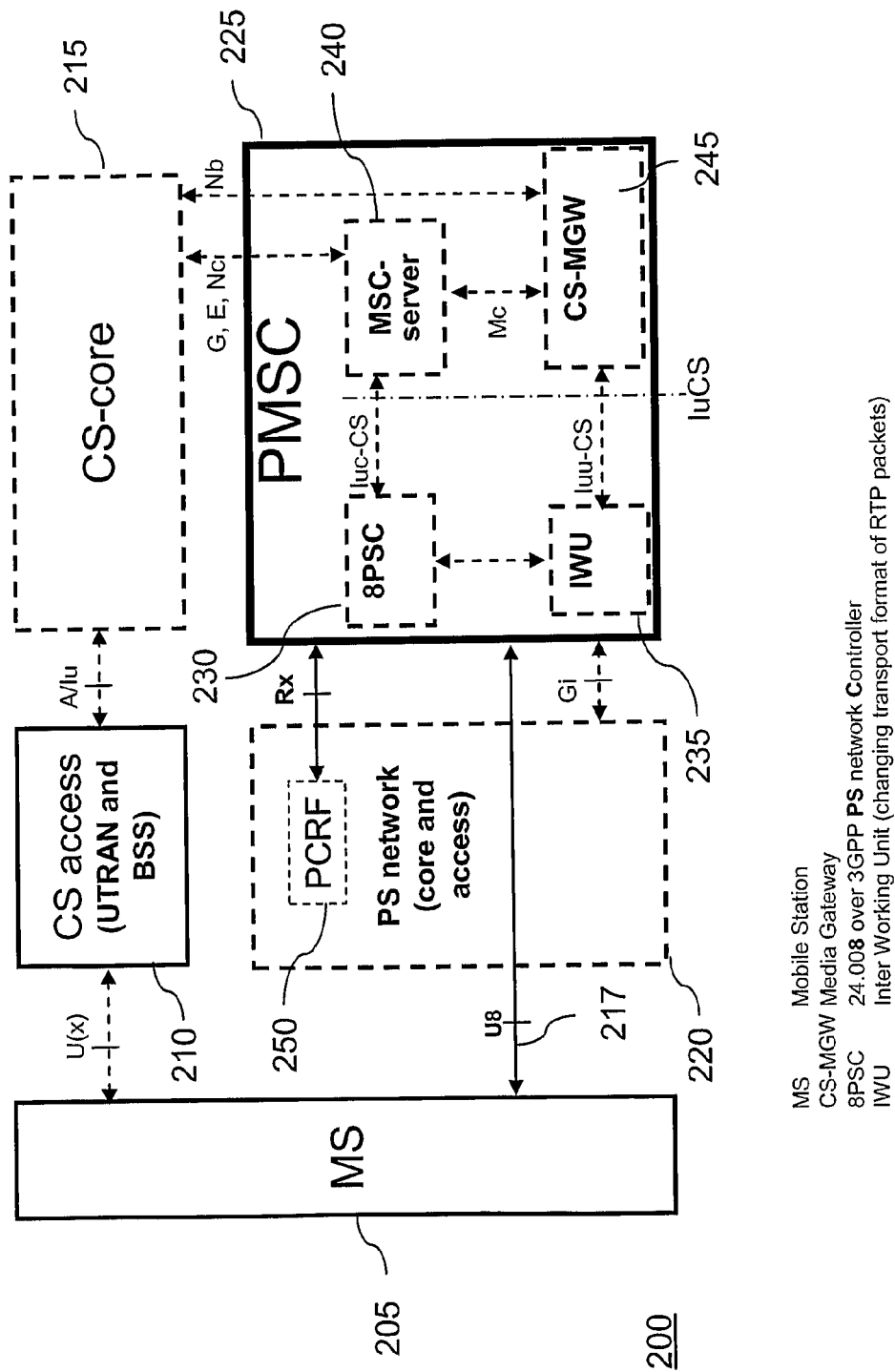
FIG. 2 illustrates a 24.008 over 3GPP PS network functional architecture according to one embodiment of the present invention.

FIG. 2 illustrates one embodiment of a 24.008 over 3GPP PS network functional architecture 200. Mobile station (MS) 205 contains functions to access the 24.008 over 3GPP packet switched (PS) network 220.

Packet mobile switching center (PMSC) 225 has new functionality as compared with a mobile switching center (MSC). PMSC 225 is able to handle the 24.008 over 3GPP PS network service. In one embodiment, PMSC 225 handles interface (U8) 217, which is an interface between mobile station 205 and PMSC 225 over PS network 220. In one embodiment, PMSC 225 is able to request certain IP Quality of service class from the PS network. PMSC 225 may be divided into 4 functional components: the MSC server 240, a network controller 230, e.g., 24.008 over 3GPP network Controller (8PSC), an Inter Working Unit (IWU) 235 and a media gateway 245, e.g., CS domain Media Gateway (CS-MGW). Network controller 230 and IWU 235 may be stand alone units or may be part of MSC-Server 240 and CS-MGW 245, respectively.

Network controller 194, 230 terminates the control plane part tunnel of the U8 interface (i.e. the U8c interface). Network controller 230 optionally authenticates the user, e.g., MS 205, before any signaling towards the Iu-CS interface is attempted. Network controller 230 is also responsible for requesting resources from Policy and Charging Rules Function (PCRF) 250.

IWU 192, 235 terminates the user plane part of the U8 interface (i.e. the U8u interface) and is responsible for repacking of the media stream from Real Time Protocol (RTP) to Nb (Nb is the interface between media gateways in the 3GPP CS domain)) framing in RTP. Optionally, if an Asynchronous Transfer Mode (ATM) based interface on Iu-CS is used, IWU 235 will also do media gatewaying between ATM and IP.

In addition to handling control information from network controller 230, MSC server 240 operates to handle control information from a mobile station via CS-core 215 and CS access 210 and media control information, Mc, from CS-MGW 245 as detailed in related specifications of the 3GPP standard. In addition to handling user plane information from IWU 235, Circuit Switched domain Media Gateway (CS-MGW) 245 also operates to handle media information as detailed in related specifications of the 3GPP standard.

MS 205 interfaces to network 210 using Um for GERAN and Uu for UMTS Terrestrial Radio Access Network (UTRAN). The term U(x) is used to denote both Um and Uu without excluding even more interfaces.

The A and Iu interfaces are the two standard CS domain interfaces between Access Network 210 and Core Network 215. The A-interface is used between GERAN 210 and MSC 240 and the Iu-CS interface can be used either between GERAN 210 and MSC 240 or between UTRAN 210 and MSC 240.

The Rx interface is the interface used by applications towards PCRF 250. It is not foreseen that this application will have any additional functionality needs on the interface.

Interface 217, i.e., U8-interface, is divided on user plane U8u 180 and control plane U8c 190. Interface 217 carries all the control and user plane information needed to e.g. Rove; and set-up, maintain, and clear 24.008 CS calls over a 3GPP PS network, e.g. network 140, 220. U8-interface 217 is between the MS 110, 205 and the PMSC 225. The interface supports all CS defined services within 3GPP 24.008, such as mobility, basic call and supplementary services.

Figure 3:
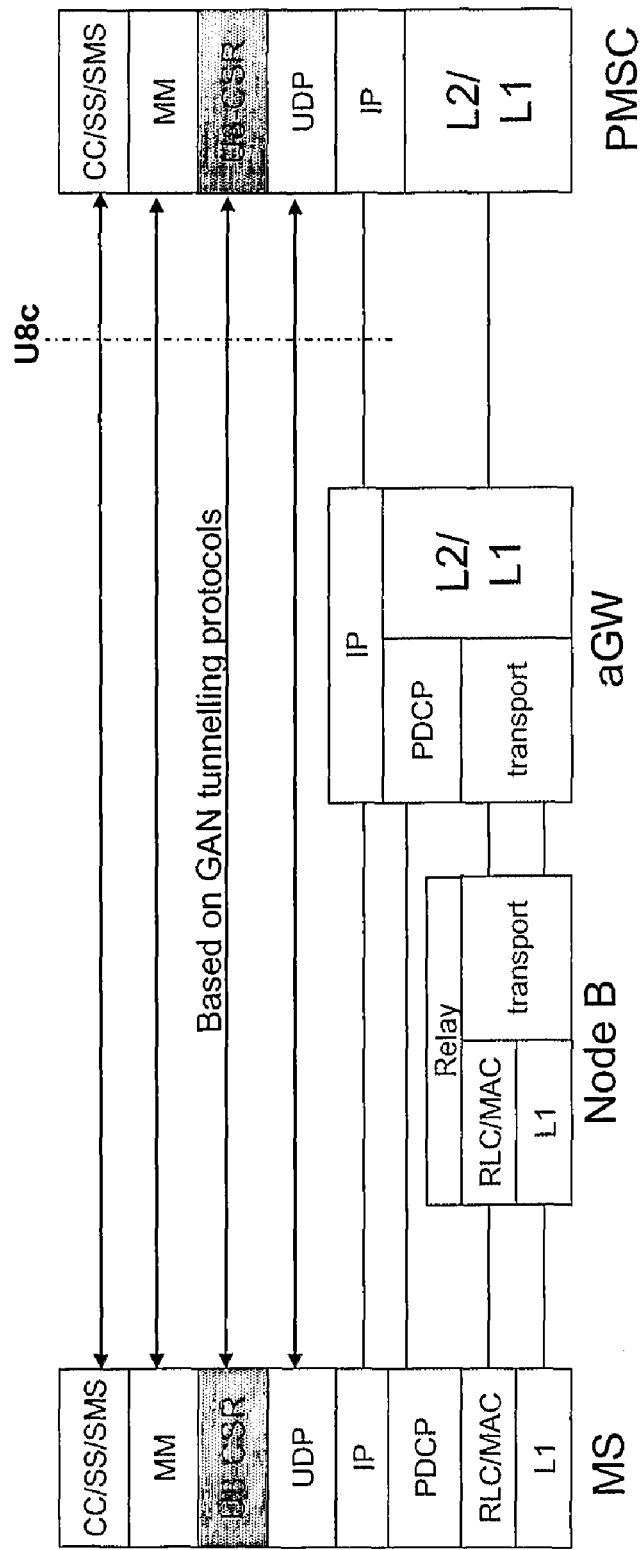
FIG. 3 illustrates a control plane PS network protocol architecture according to one embodiment of the present invention.

The Gi interface is the IP-based interface coming out from the 3GPP PS network. In current standards for EPS (Evolved Packet System) according to 3GPP 23.402 this reference point is called an SGi. On a functional level there is no real difference between Gi and SGi. In one embodiment, the Gi interface (or the SGi) is implemented using AGW 144 (which can be broken up into Serving GW and PDN GW according to current standardisation). In another embodiment using a GPRS PS network, the Gi interface is implemented using GGSN. In yet another embodiment using WiMAX, architecture the AGW can be translated into the Access Service Network Gateway and Home Agent. In the WiMAX architecture there are no name corresponding to the Gi and SGi reference points FIG. 3 illustrates a control plane PS network protocol architecture. One embodiment of a 24.008 over 3GPP PS network protocol architecture for the control plane in LTE is shown. In GPRS and UMTS the protocol stack will look very similar, however some different node entities exists.

The embodiment shown in FIG. 3 illustrates features of the U8c interface for the 24.008 over 3GPP PS network service. The 3GPP PS network provides the generic IP connectivity between the MS and the PMSC. In this embodiment, the PMSC is connected via the Gi-interface.

UDP provides transport for the U8 Circuit Switched Resources (U8-CSR) 217 between MS 110, 205 and PMSC 225. In one embodiment, U8-CSR is based on GAN (Generic Access Network) tunneling protocols as defined in 3GPP TS 43.318 and 44.318. The U8-CSR protocol manages the IP connection and performs functionality equivalent to the GSM-RR protocol. Protocols, such as mobility management (MM) and above, e.g., CC/SS/SMS, are carried transparently between MS 110, 205 and PMSC 225. The IP address of MS 110, 205 is used by PMSC 225 to communicate with the MS 110, 205 for the 24.008 over 3GPP PS network service.

Figure 4:
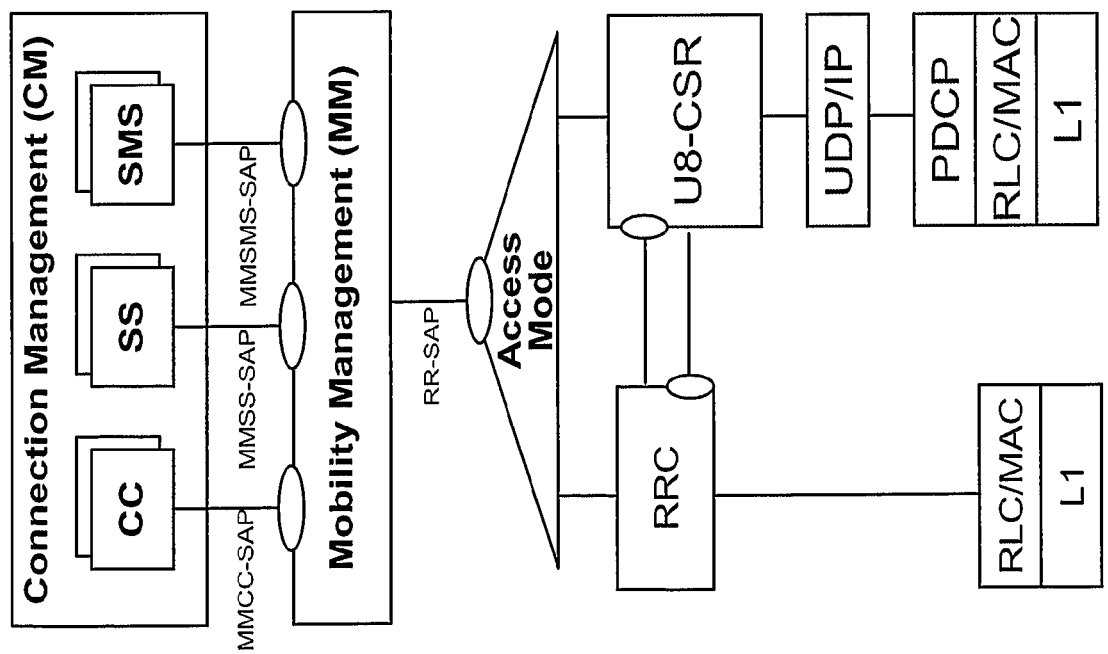
FIG. 4 illustrates MS architecture for the CS domain control plane according to one embodiment of the present invention.

FIG. 4 illustrates MS architecture for the CS domain control plane in MS 110, 205. A Connection Management (CM) layer comprises call control (CC), signaling subsystem (SS), and short message service (SMS) services. Mobility Management (MM) layer interfaces with CC, SS, and SMS services of the CM layer using corresponding service access points (SAPs). The Radio Resource SAP (RR-SAP) interface to the UMTS/GSM-MM layer is preserved identically for GSM, UMTS and 24.008 over 3GPP PS network (and for GAN if present) access. An access mode switch is provided to switch between UTRAN/GERAN and 24.008 over 3GPP PS network modes (and GAN if present). U8-CSR peers with UTRAN-RRC/GSM-RR to provide coordination for handover. Note: The RLC/MAC/L1 can be the same in some cases, e.g. in the UMTS CS and PS radio interfaces.

Figure 5:
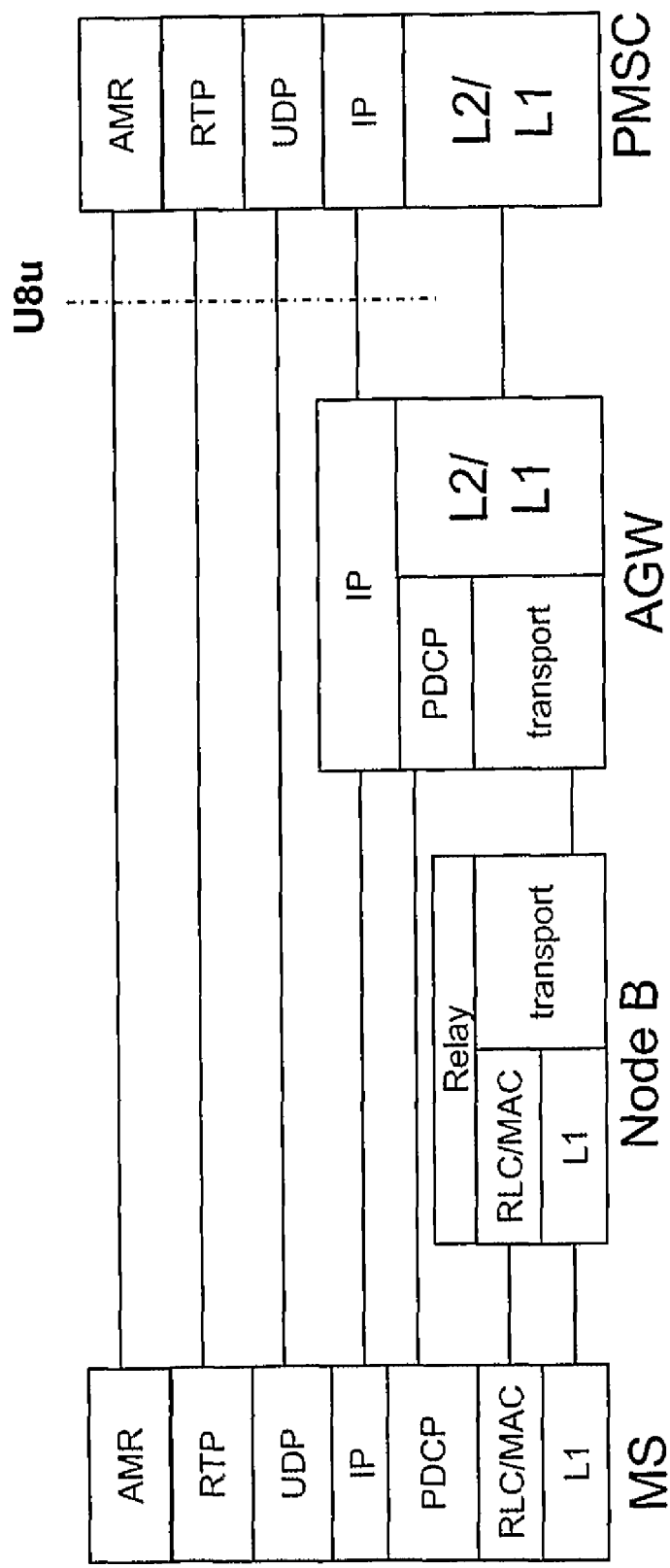
FIG. 5 illustrates a user plane PS network protocol architecture according to one embodiment of the present invention.

FIG. 5 illustrates a user plane PS network protocol architecture. The embodiment shown in FIG. 5 illustrates features of the U8u interface for the 24.008 over 3GPP PS network service. The 3GPP PS network provides the generic connectivity between the MS and the IP network. CS domain user plane is transported over RTP/UDP between MS and PMSC. Standard 3GPP codecs, e.g. AMR, as specified e.g. in 3GPP TS 26.071, are supported when operating in 24.008 over 3GPP PS network mode. CS-data is transported over RTP/UDP, by defining a new RTP frame format to carry the TAF (Terminal Adaptation Function)-TRAU (Transcoder and Rate Adaptation Unit) (V.110 like) frames over RTP. TTY is transported using CTM over GSM codec over RTP/UDP. Header compression (such as ROHC) for efficient voice transport over the radio access network can optionally be supported by 3GPP PS access and PS core nodes.

The U8-CSR protocol provides a resource management layer, which is equivalent to the GSM-RR or UTRAN-RRC and provides the following functions: discovery, i.e. selecting the 24.008 over 3GPP PS network supporting PMSC; setup of IP bearer resources for CS service between the MS and PMSC (8PSC functional entity); handover support between UTRAN/GERAN and 24.008 over 3GPP PS network; and functions such as paging, ciphering configuration, classmark change, etc.

Figure 6:
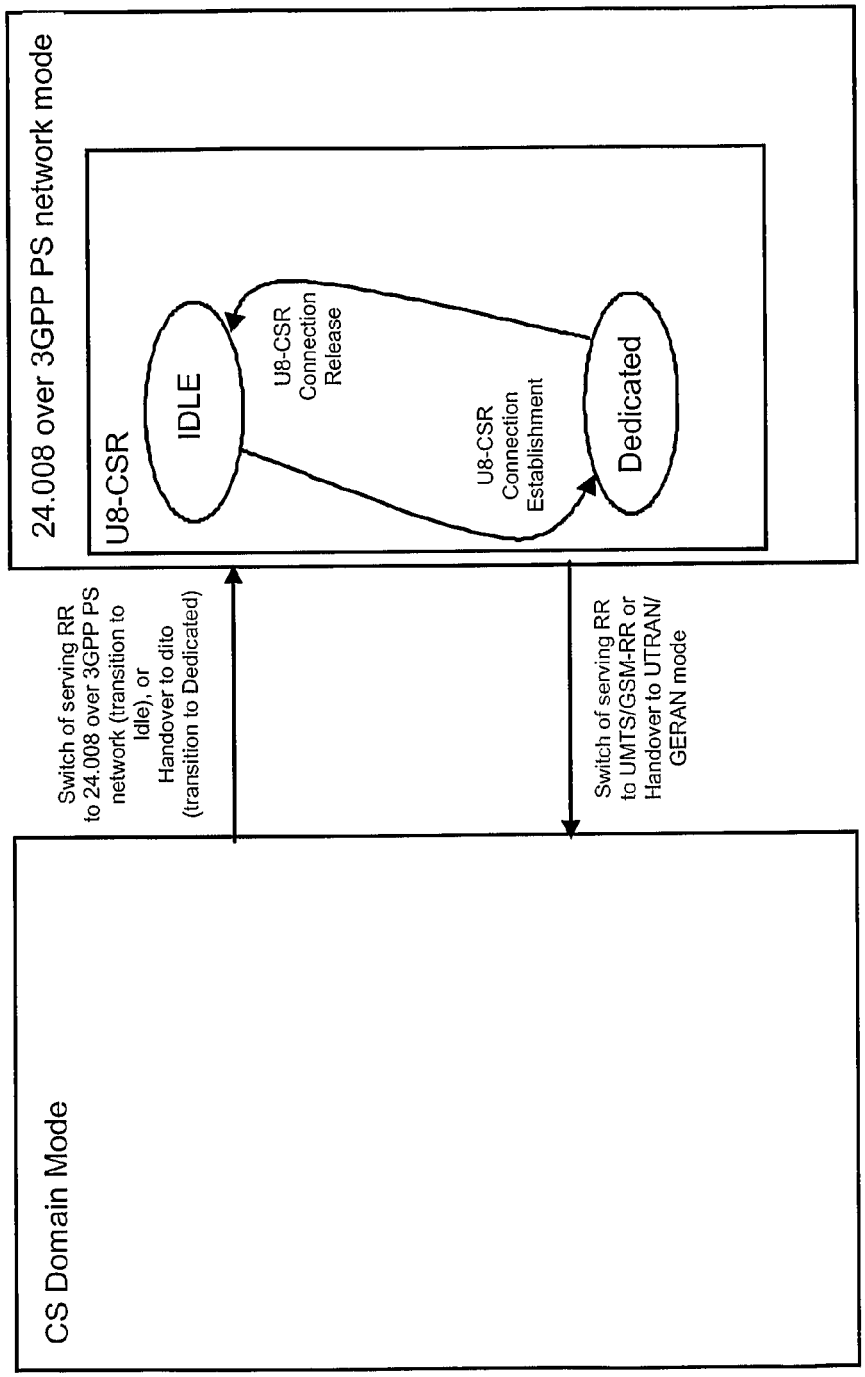
FIG. 6 illustrates a state diagram for an MS implementing the 24.008 over 3GPP PS network functionality according to one embodiment of the present invention.

FIG. 6 illustrates an exemplary state diagram for an MS implementing the 24.008 over 3GPP PS network mode. The U8-CSR sub-layer in the MS can be in two states U8-CSR-IDLE or U8-CSR-DEDICATED depending on if there exists a U8-CSR signaling connection between the MS and the PMSC. If this signaling connection exists the U8-CSR sub-layer in the MS is in U8-CSR-DEDICATED state and otherwise it is in U8-CSR-IDLE state.

The MS enters 24.008 over PS network mode when the MS switches the serving RR entity to U8-CSR and the SAP between the MM and the U8-CSR is activated. While the MS remains in 24.008 over 3GPP PS network mode it performs normal and periodic Location Updates and application level keep-alive with the 24.008 over 3GPP PS network supporting PMSC.

The MS moves from the U8-CSR-IDLE state to the U8-CSR-DEDICATED state when the U8-CSR connection is established and returns to U8-CSR-IDLE state when the U8-CSR connection is released. Upon U8-CSR connection release an indication that no dedicated resources exist is passed to the upper layers.

The MS may also enter U8-CSR-DEDICATED state in 24.008 over PS network mode to from CS Domain mode when Handover to 24.008 over 3GPP PS network is being performed. In the same way, the MS enters CS Domain mode from U8-CSR-DEDICATED when Handover from 24.008 over 3GPP PS network.

The 24.008 over 3GPP PS network supports security mechanisms at different levels and interfaces. It is assumed that the 3GPP PS access is secure enough for the service (using the security mechanism specified for the PS service). Optionally IPsec (IPsec is used by IMS) may be utilized to secure the signaling. Authentication will be done on MM layer, and controlled by the PMSC (normal SIM and ISIM authentication procedures).

In addition, it may be desirable to provide security between the AGW and the PMSC. For example, the AGW resides in the HPLMN and the PMSC resides in the VPLMN in the roaming case and it might be appropriate to provide some low-level security (e.g. IPsec tunnels) for the traffic between the AGW and the PMSC.

Figure 7:
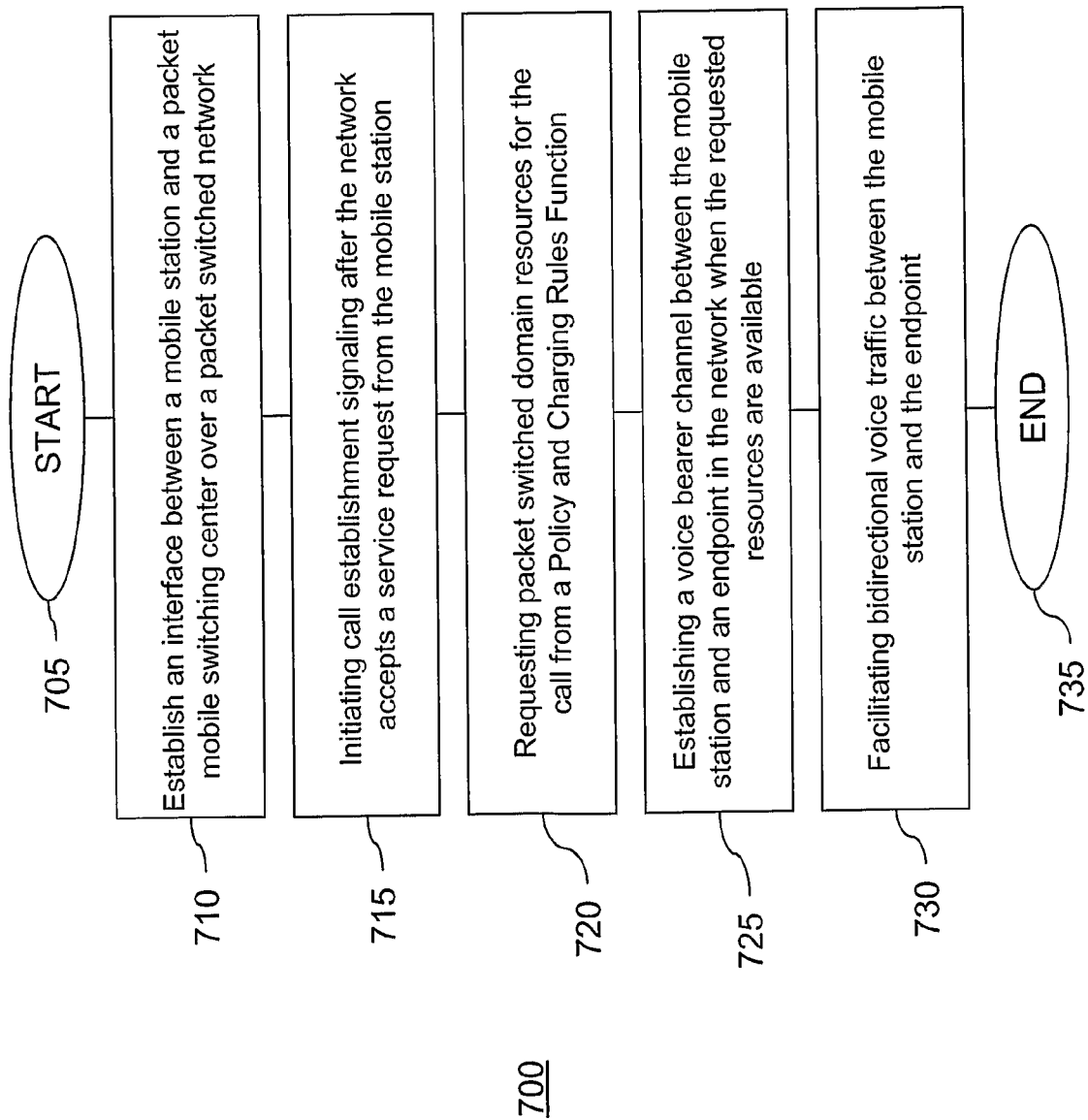
FIG. 7 illustrates a diagram of a method of providing a mobile originated call according to one embodiment of the present invention.

FIG. 7 illustrates a diagram of a method of providing a mobile originated call according to one embodiment. Method 700 starts at step 705 and proceeds to step 710. At step 710, an interface is established between a mobile station and a packet mobile switching center over a packet switched network. At step 715, call establishment signaling is initiated after the network accepts a service request from the mobile station. At step 720, packet switched domain resources are requested for the call from a Policy and Charging Rules Function (PCRF). At step 725, a voice bearer channel is established between the mobile station and an endpoint in the network when the requested resources are available. At step 730, bidirectional voice traffic is facilitated between the mobile station and the endpoint.

Figure 8:
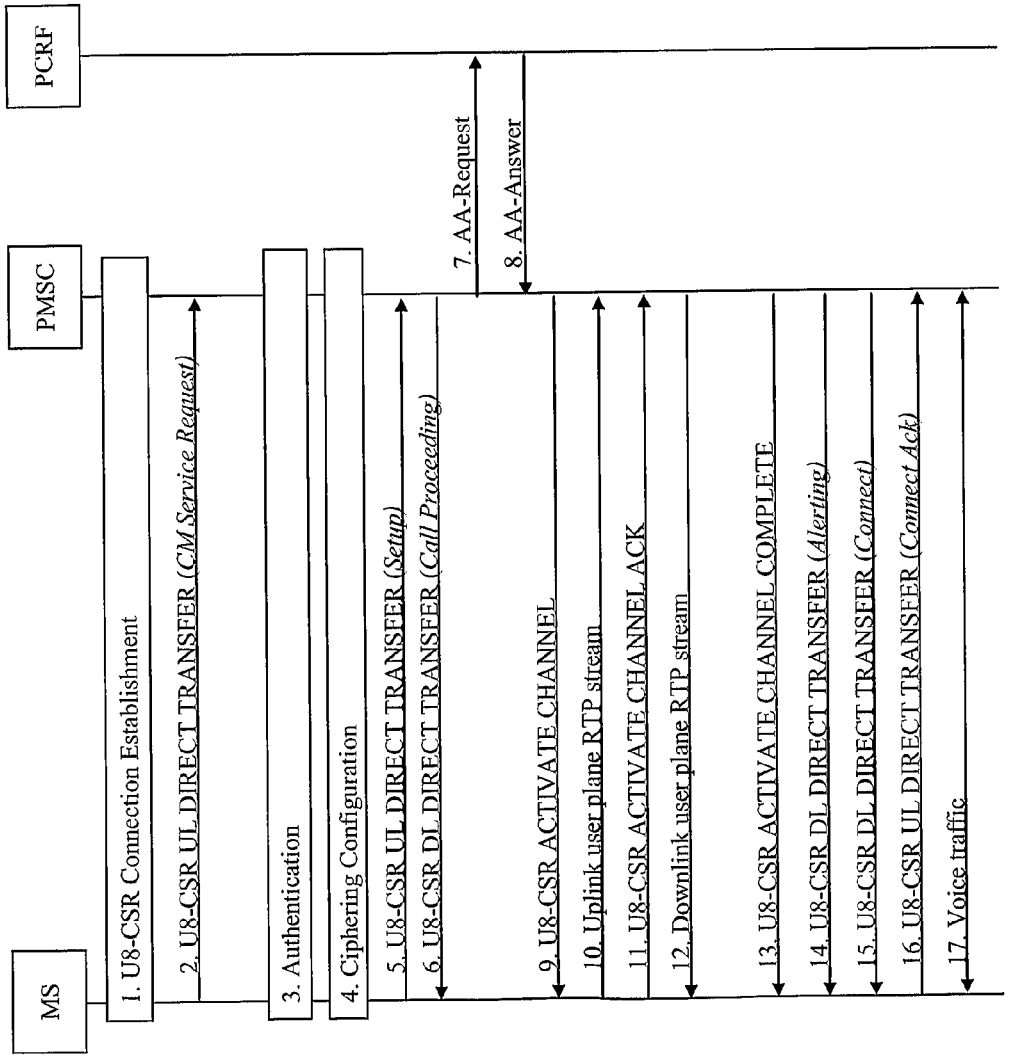
FIG. 8 illustrates a mobile originated call flow when in 24.008 over 3GPP PS network mode.

FIG. 8 illustrates a mobile originated call flow when in 24.008 over 3GPP PS network mode. The description of this procedure assumes the MS is in 24.008 over 3GPP PS network mode i.e. it has successfully registered with the 24.008 over 3GPP PS network supporting PMSC (and U8-CSR is the serving RR entity in the MS).

1. Upon request from the upper layers, the U8-CSR Connection Establishment procedure is performed as described FIG. 13.

2. The MS sends the CM Service Request to the 24.008 over 3GPP PS network supporting PMSC in the U8-CSR UL DIRECT TRANSFER.

3. The PMSC may optionally authenticate the MS using standard MM authentication procedures. Other MM procedures may also be triggered by the PMSC, as in normal operation (e.g. Identity Request to retrieve the IMEISV).

4. The PMSC may optionally initiate the Ciphering Configuration procedure described in FIG. 15. If the Ciphering Configuration is not performed, the PMSC returns the CM Service Accept (MM) message to the MS. This step is the indication from the network that is has accepted the service request for mobile originated call from the MS.

5. The MS sends the Setup message providing details on the call to the PMSC and its bearer capability and supported codecs. This message is contained within the U8-CSR UL DIRECT TRANSFER between the MS and the 24.008 over 3GPP PS network supporting PMSC.

6. The PMSC indicates it has received the call setup and it will accept no additional call-establishment information using the Call Proceeding message to the MS in the U8-CSR DL DIRECT TRANSFER.

7. The PMSC now needs to ask for resources in the PS domain for this call from the PCRF. This is done with the Diameter AA-Request command. This may result in the creation of a secondary PDP context for the user plane part.

8. If the PCRF can fulfill the request, it responses with AA-Answer command.

9. When the 24.008 over 3GPP PS network supporting PMSC has got the terminating user plane addresses, e.g. UDP port and IP address of a Media Gateway, it will request PS resources for the call. In the PS network a secondary PDP context may have been established which mayl be used for the call. The PMSC will then send a U8-CSR ACTIVATE CHANNEL to the MS including bearer path setup information such as:

Channel mode.
Multi-rate codec configuration.
UDP port & the IP address for the uplink RTP stream.
Voice sample size.

10. The MS establishes the RTP path to receiving endpoint in the IP network

11. The MS sends the U8-CSR ACTIVATE CHANNEL ACK to the 24.008 over 3GPP PS network supporting PMSC indicating the UDP port for the downlink RTP stream.

12. The downlink RTP path between the endpoint in the IP network and the MS is established. The endpoint may start sending idle RTP/UDP packets to the MS.

13. The 24.008 over 3GPP PS network supporting PMSC signals the completion of the bearer path to the MS with the U8-CSR ACTIVATE CHANNEL COMPLETE message. An end-to-end audio path now exists between the MS and the CN. The MS can now connect the user to the audio path.

14. The CN signals to the MS, with the Alerting message, that the B-Party is ringing. The message is transferred to the 24.008 over 3GPP PS network supporting PMSC and it forwards the message to the MS in the U8-CSR DL DIRECT TRANSFER. If the MS has not connected the audio path to the user, it shall generate ring back to the calling party. Otherwise, the network-generated ring back will be returned to the calling party.

15. The CN signals that the called party has answered, via the Connect message. The message is transferred to the 24.008 over 3GPP PS network supporting PMSC and it forwards the message to the MS in the U8-CSR DL DIRECT TRANSFER. If the mobile station is generating ring back, it stops and connects the user to the audio path.

16. The MS sends the Connect Ack in response, and the parties are connected for the voice call. The Connect Ack message is contained within the U8-CSR UL DIRECT TRANSFER between the MS and the 24.008 over 3GPP PS network supporting PMSC.

17. Bi-directional voice traffic flows between the MS and the other end point in the IP network.

Figure 9:
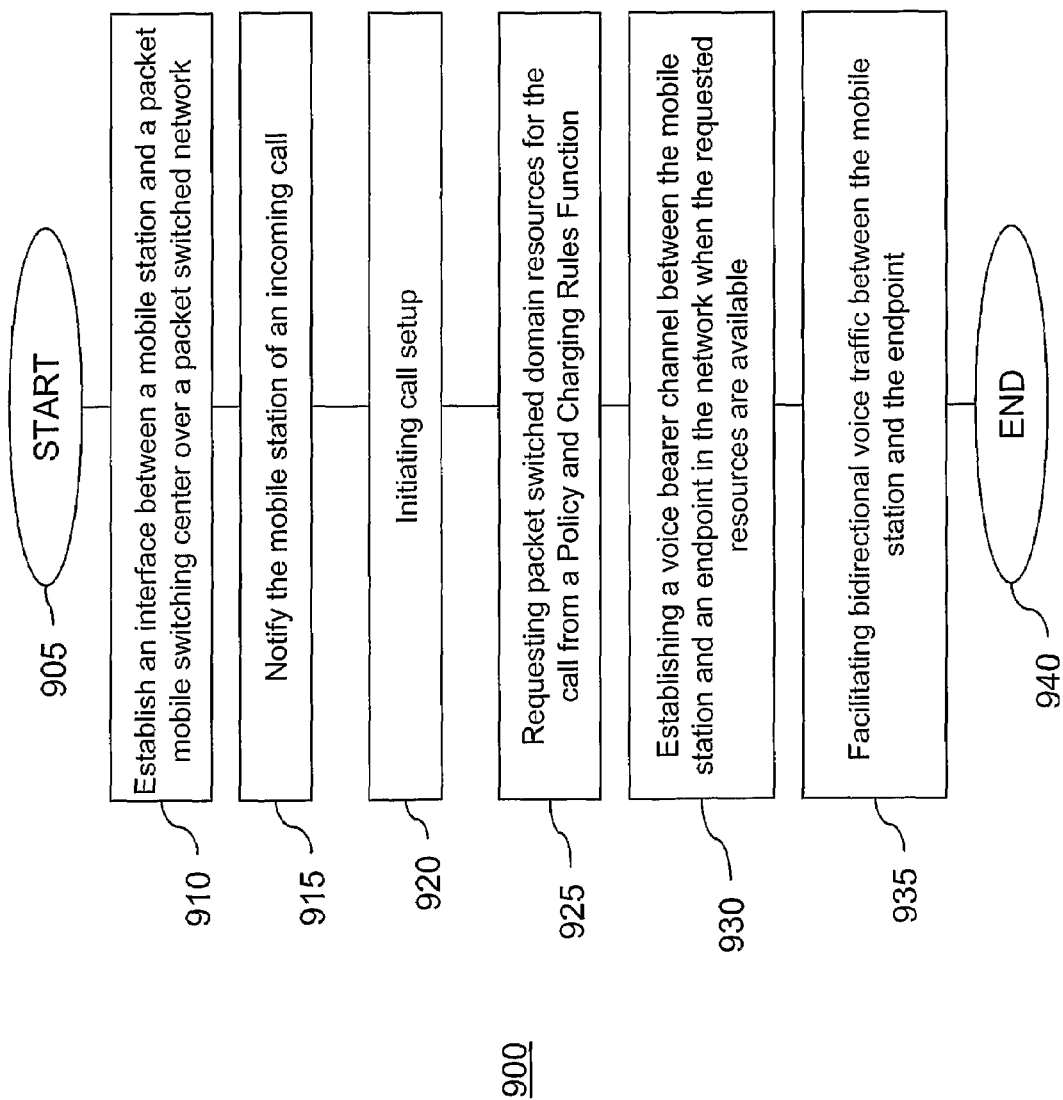
FIG. 9 illustrates a diagram of a method of providing a mobile terminated call according to one embodiment of the present invention.

FIG. 9 illustrates a diagram of a method of providing a mobile terminated call according to one embodiment, Method 900 starts at step 905 and proceeds to step 910. At step 910, an interface between a mobile station and a packet mobile switching center is established over a packet switched network. At step 915, the mobile station is notified of an incoming call. At step 920, call setup is initiated. At step 925, packet switched domain resources are requested for the call from a Policy and Charging Rules Function (PCRF). At step 930, a voice bearer channel is established between the mobile station and an endpoint in the network when the requested resources are available. At step 935, bidirectional voice traffic is facilitated between the mobile station and the endpoint.

Figure 10:
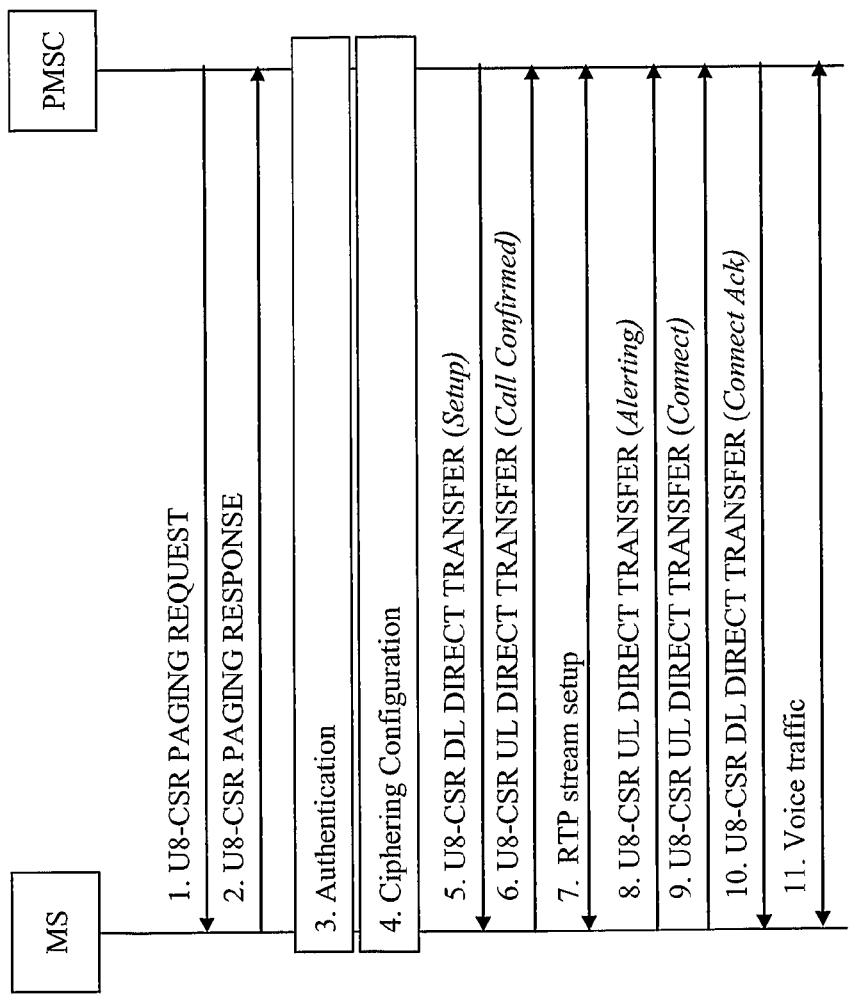
FIG. 10 illustrates a mobile terminated call flow when in 24.008 over 3GPP PS network mode.

FIG. 10 illustrates a mobile terminated call flow when in 24.008 over 3GPP PS network mode. The description of the procedure in this clause assumes the MS is in 24.008 over 3GPP PS network mode i.e. it has successfully registered with the 24.008 over 3GPP PS network supporting PMSC and U8-CSR is the serving RR entity in the MS.

1. A mobile-terminated call arrives at the 24.008 over 3GPP PS network supporting PMSC. It then pages the MS using the U8-CSR PAGING REQUEST message.

2. The MS responds with a U8-CSR PAGING RESPONSE including the MS Classmark and ciphering key sequence number. The MS enters dedicated mode and the U8-CSR state changes to U8-CSR-DEDICATED. This means that the U8-CSR signaling connection is implicitly established between the MS and the PMSC.

3. The PMSC may optionally authenticate the MS using standard MM authentication procedures.

4. The PMSC may optionally update the ciphering configuration in the MS, via the 24.008 over 3GPP PS network supporting PMSC, as described in FIG. 15.

5. The 24.008 over 3GPP supporting PMSC initiates call setup using the Setup message it sends to the MS in the U8-CSR DL DIRECT TRANSFER message.

6. The MS responds with Call Confirmed using the U8-CSR UL DIRECT TRANSFER after checking it's compatibility with the bearer service requested in the Setup and modifying the bearer service as needed. If the Setup included the signal information element, the MS alerts the user using the indicated signal, else the MS alerts the user after the successful configuration of the user plane.

7. The 24.008 over 3GPP over PS network supporting PMSC initiates the assignment procedure, which triggers the setup of the RTP stream (voice bearer channel) between MS and other endpoint in the IP network, same as steps 7-13 in the Mobile Originating call scenario in FIG. 9.

8. The MS signals that it is alerting the user, via the Alerting message contained in the U8-CSR UL DIRECT TRANSFER to the 24.008 over 3GPP PS network supporting PMSC, which sends a corresponding alerting message to the calling party.

9. The MS signals that the called party has answered, via the Connect message contained in the U8-CSR UL DIRECT TRANSFER to the 24.008 over 3GPP PS network supporting PMSC, which sends a corresponding Connect message to the calling party.

10. The 24.008 over 3GPP PS network supporting PMSC acknowledges via the Connect Ack message to the MS in the U8-CSR DL DIRECT TRANSFER.

11. Bi-directional voice traffic flows between the MS and the other endpoint in the IP network.

Figure 11:
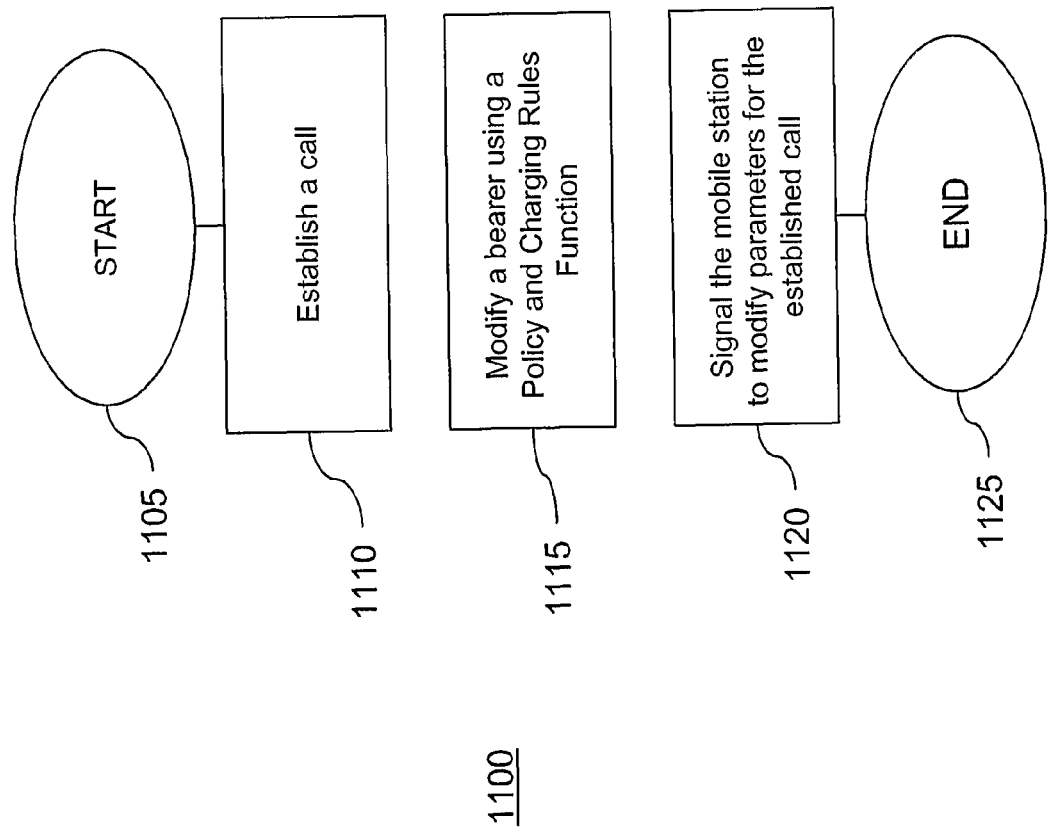
FIG. 11 illustrates a diagram of a method of providing a mobile terminated call according to one embodiment of the present invention

FIG. 11 illustrates a diagram of a method of providing a mobile terminated call according to one embodiment. Method 1100 starts at step 1105 and proceeds to step 1110. At step 1110, a call is established. At step 1115, a bearer is modified using a Policy and Charging Rules Function (PCRF). At step 1120, the mobile station is signaled to modify parameters for the established call.

Figure 12:
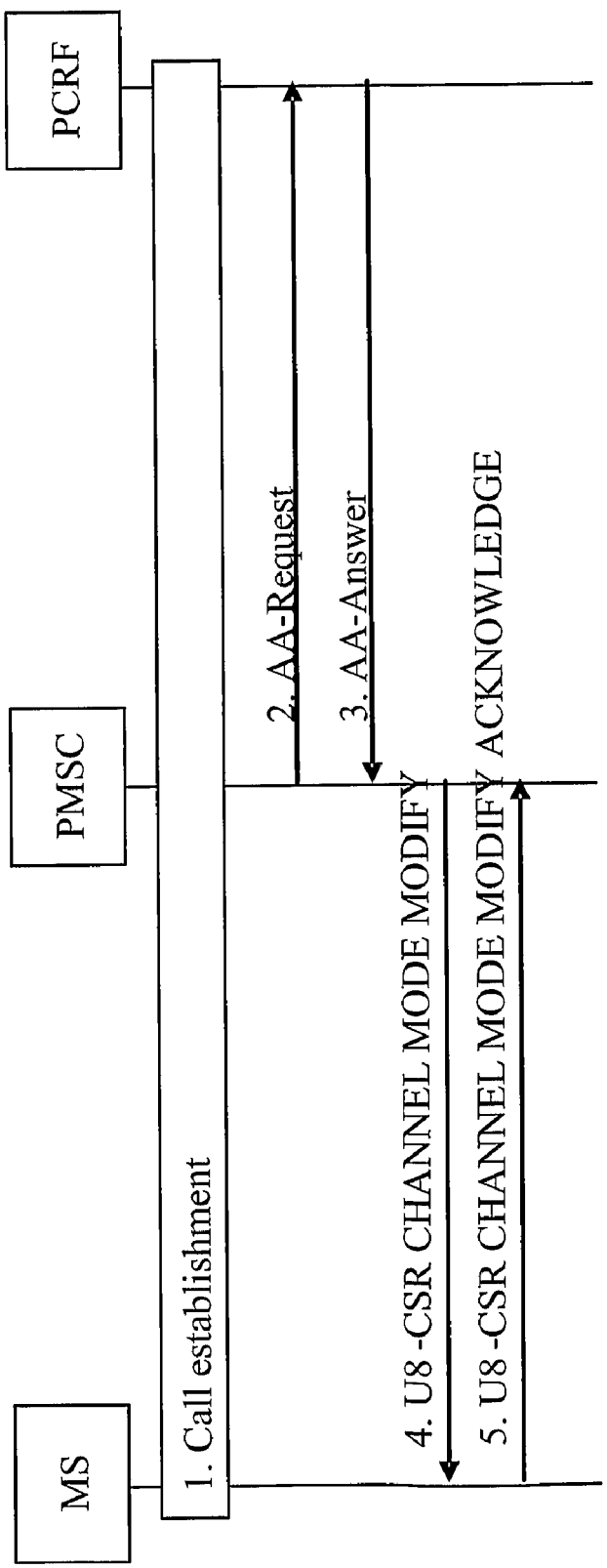
FIG. 12 illustrates a channel modify procedure according to one embodiment of the present invention.

FIG. 12 illustrates a channel modify procedure according to one embodiment. The 24.008 over 3GPP PS network supporting PMSC may use the Channel Modify procedures to modify parameters used for an ongoing call, this procedure may be used if coding scheme should be changed, in fault or congestion situations if the 24.008 over 3GPP PS network supporting PMSC for example detects "packet loss" and Handover to another CS Domain mode is not possible or desired.

The 24.008 over 3GPP PS network supporting PMSC may modify for example the following parameters:

Channel mode.
Sample Size.
IP address.
RTP UDP port.
RTCP UDP port.

1. A call is established as described in FIG. 7, 8, 9, or 10.

2. The PMSC may need to modify the user plane bearer for a CS call over the 3GPP PS network. This is done via the Diameter AA-Request Command.

3. The PCRF responses with AA-Answer Command.

4. The 24.008 over 3GPP PS network supporting PMSC sends the U8-CSR CHANNEL MODE MODIFY message to the MS to modify parameters for the established call.

5. The MS responds with the U8-CSR CHANNEL MODE MODIFY ACKNOWLEDGE message to the 24.008 over 3GPP PS network supporting PMSC.

Figure 13:
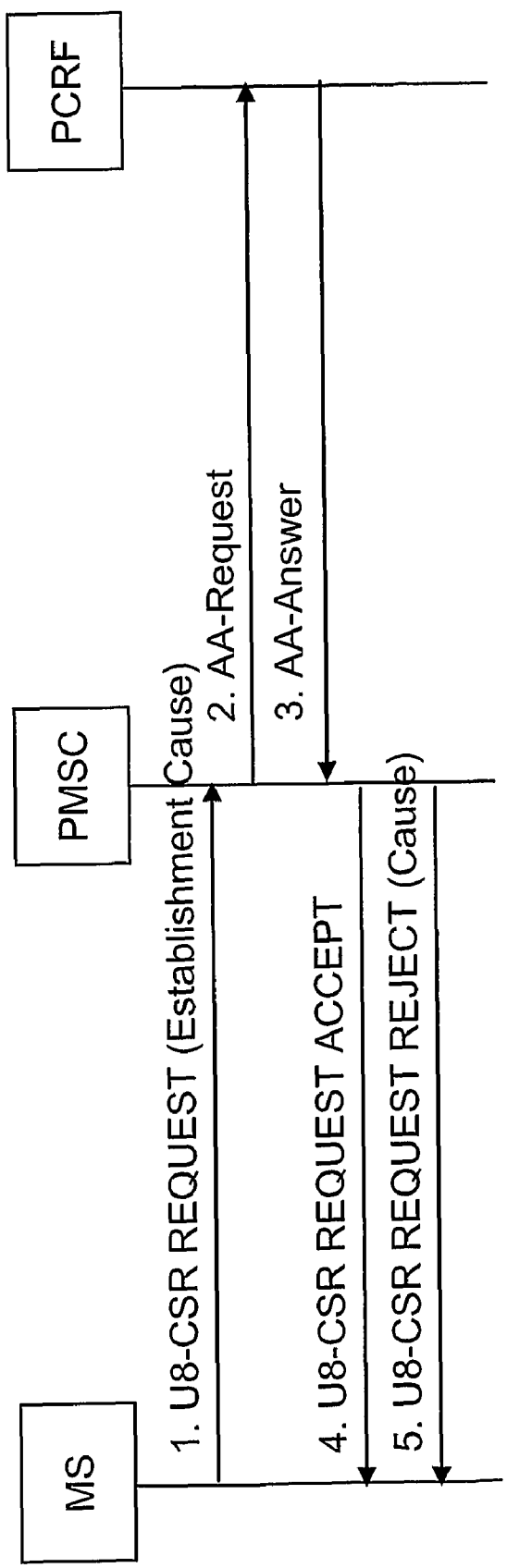
FIG. 13 illustrates a U8-CSR connection establishment procedure according to one embodiment of the present invention.

FIG. 13 illustrates a U8-CSR connection establishment procedure according to one embodiment. FIG. 13 shows successful establishment of the U8-CSR Connection.

1. The MS initiates U8-CSR connection establishment by sending the U8-CSR REQUEST message to the 24.008 over 3GPP PS network supporting PMSC. This message contains the Establishment Cause indicating the reason for U8-CSR connection establishment.

2. Depending on the reason for U8-CSR connection establishment, the PMSC may request modification of the signaling bearer from the PCRF to be able to cope with signaling that may follow.

3. Possible response from the PCRF.

4. 24.008 over 3GPP PS network supporting PMSC signals the successful response to the MS by sending the U8-CSR REQUEST ACCEPT and the MS enters dedicated mode and the U8-CSR state changes to U8-CSR-DEDICATED.

5. Alternatively, the 24.008 over 3GPP PS network supporting PMSC may return a U8-CSR REQUEST REJECT indicating the reject cause.

Figure 14:
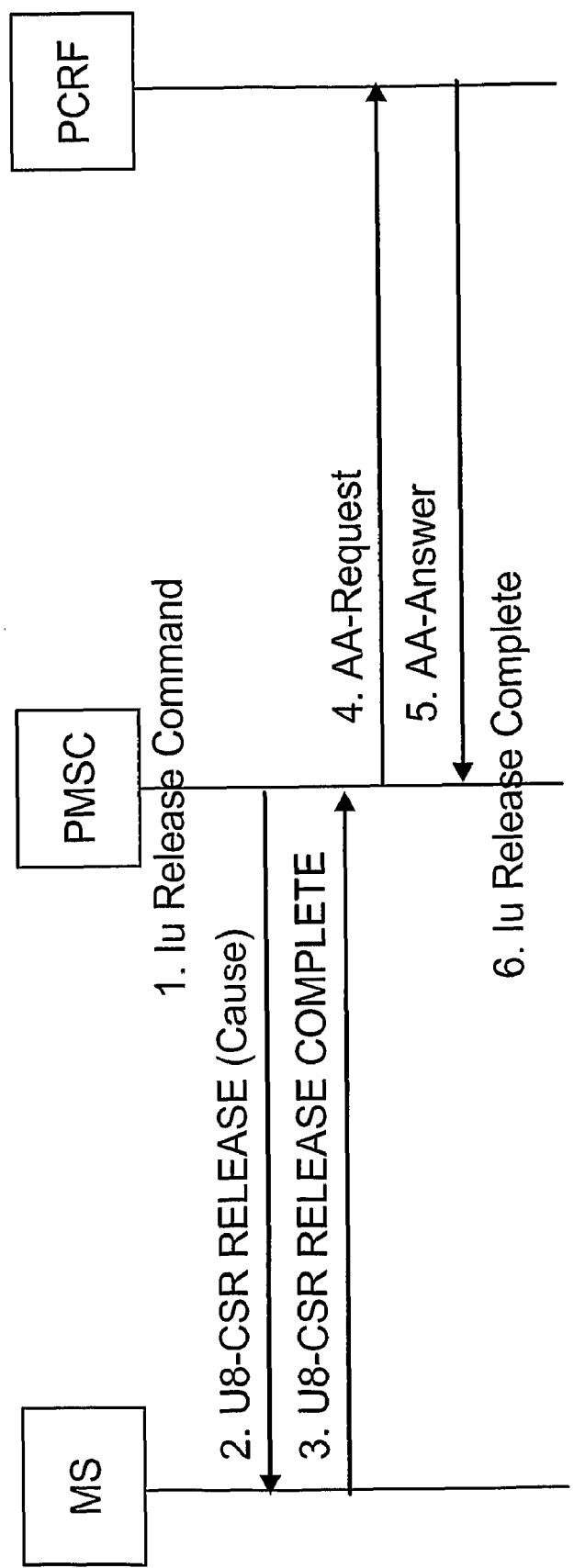
FIG. 14 illustrates a U8-CSR connection release procedure according to one embodiment of the present invention.

FIG. 14 illustrates a U8-CSR connection release procedure according to one embodiment. FIG. 14 shows release of the logical U8-CSR connection between the MS and the 24.008 over 3GPP PS network supporting PMSC.

1. The 24.008 over 3GPP PS network supporting PMSC decides to release the signalling and user plane connection resources allocated to the MS (e.g. in Iu interface that could be seen as an Iu Release Command).

2. The 24.008 over 3GPP PS network supporting PMSC commands the MS to release the signalling plane and user plane resources, using the U8-CSR RELEASE message.

3. The MS confirms resource release to the 24.008 over 3GPP PS network supporting PMSC using the U8-CSR RELEASE COMPLETE message and the MS enters idle mode and the U8-CSR state in the MS changes to U8-CSR-IDLE.

4. If resources have been requested in the U8-CSR connection

Establishment and/or during the traffic channel assignment, the PMSC will ask for a modification of the signaling bearer from the PCRF. The PMSC may also ask PCRF to release the Secondary PDP context is such was allocated for the user plane. This may be uncorrelated to step 2 and 3.

5. Response from the PCRF.

6. All the signaling and user plane connection resources allocated to the MS are released (e.g. in Iu interface that could be seen as an Iu Release Complete).

Figure 15:
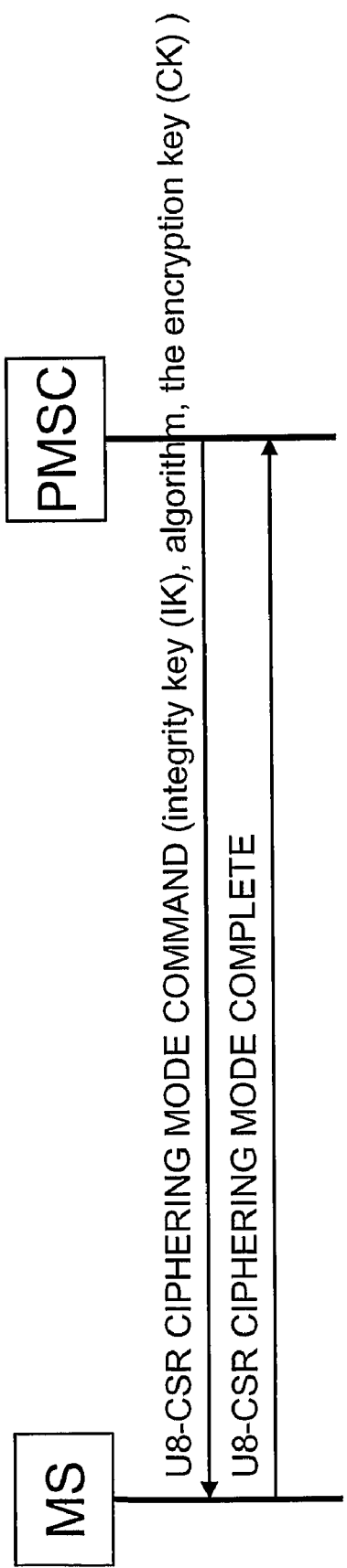
FIG. 15 illustrates a ciphering configuration flow according to one embodiment of the present invention.

FIG. 15 illustrates a ciphering configuration flow according to one embodiment. The message flow for ciphering configuration is shown. The term ciphering configuration is normally used for GSM CS operations and the corresponding term for UMTS CS (and PS) operations is Security Mode Command.

1. The 24.008 over 3GPP PS network supporting PMSC sends U8-CSR CIPHERING MODE COMMAND to the MS. This message indicates the integrity protection and encryption settings (i.e., that may be applicable after handover/relocation to CS Domain mode). MS stores the information for possible future use after a handover/relocation to CS Domain mode. The message may also indicate whether the MS shall include IMEISV in the U8-CSR CIPHERING MODE COMPLETE message.

2. The MS then sends U8-CSR CIPHERING MODE COMPLETE message to network and includes the IMEISV, if indicated so in the U8-CSR CIPHERING MODE COMMAND 9.9 U8-CSR Signaling and SMS Transport Procedures.

Figure 16:
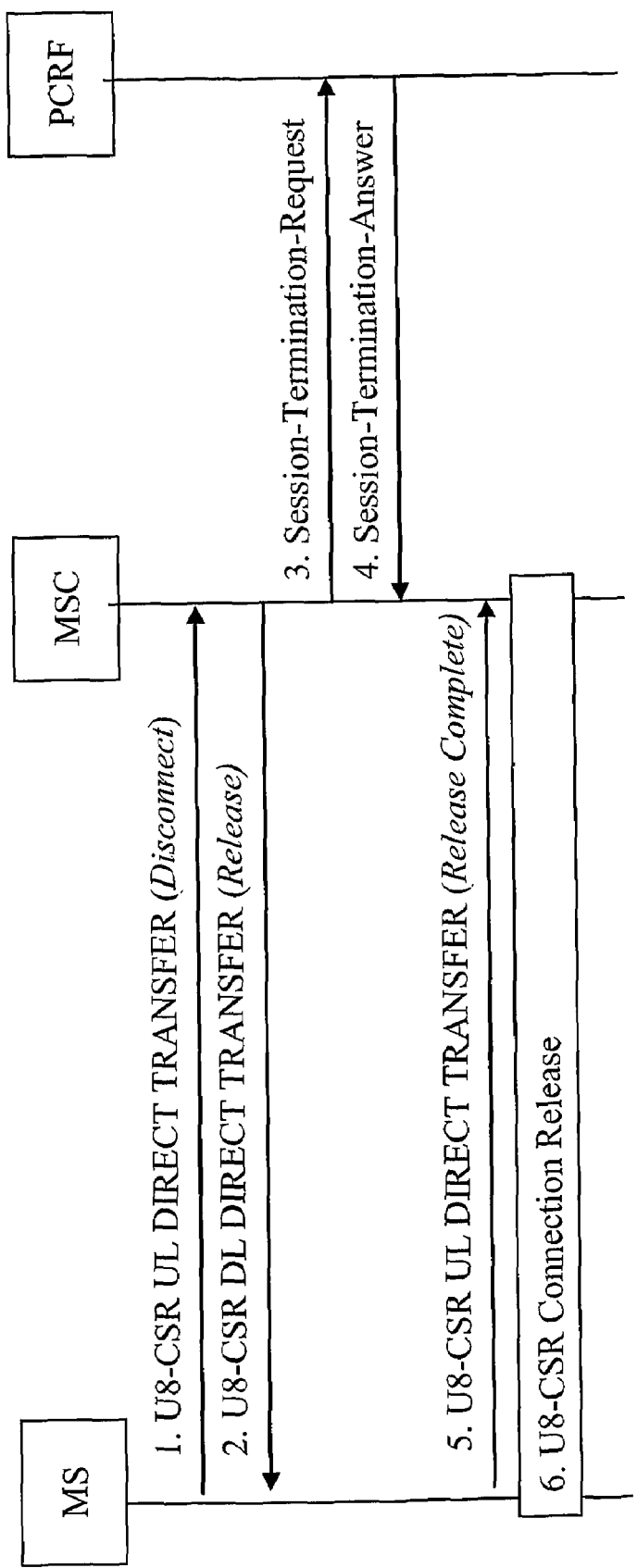
FIG. 16 illustrates call clearing according to one embodiment of the present invention.

FIG. 16 illustrates call clearing according to one embodiment.

1. The MS sends the Disconnect message to the 24.008 over 3GPP PS network supporting PMSC to release the call. This message is contained in the U8-CSR UL DIRECT TRANSFER 2. The 24.008 over 3GPP PS network supporting PMSC responds with a Release message to the MS using the U8-CSR DL DIRECT TRANSFER message.

3. The PMSC needs to release the PS resources allocated for the call and it sends a Diameter Session-Termination-Request Command to the PCRF.

4. The PCRF acknowledges with Session-Termination-Answer Command.

5. The MS responds with the Release Complete message. This message is contained within the U8-CSR UL DIRECT TRANSFER message between MS and 24.008 over 3GPP PS network supporting PMSC.

Figure 17:
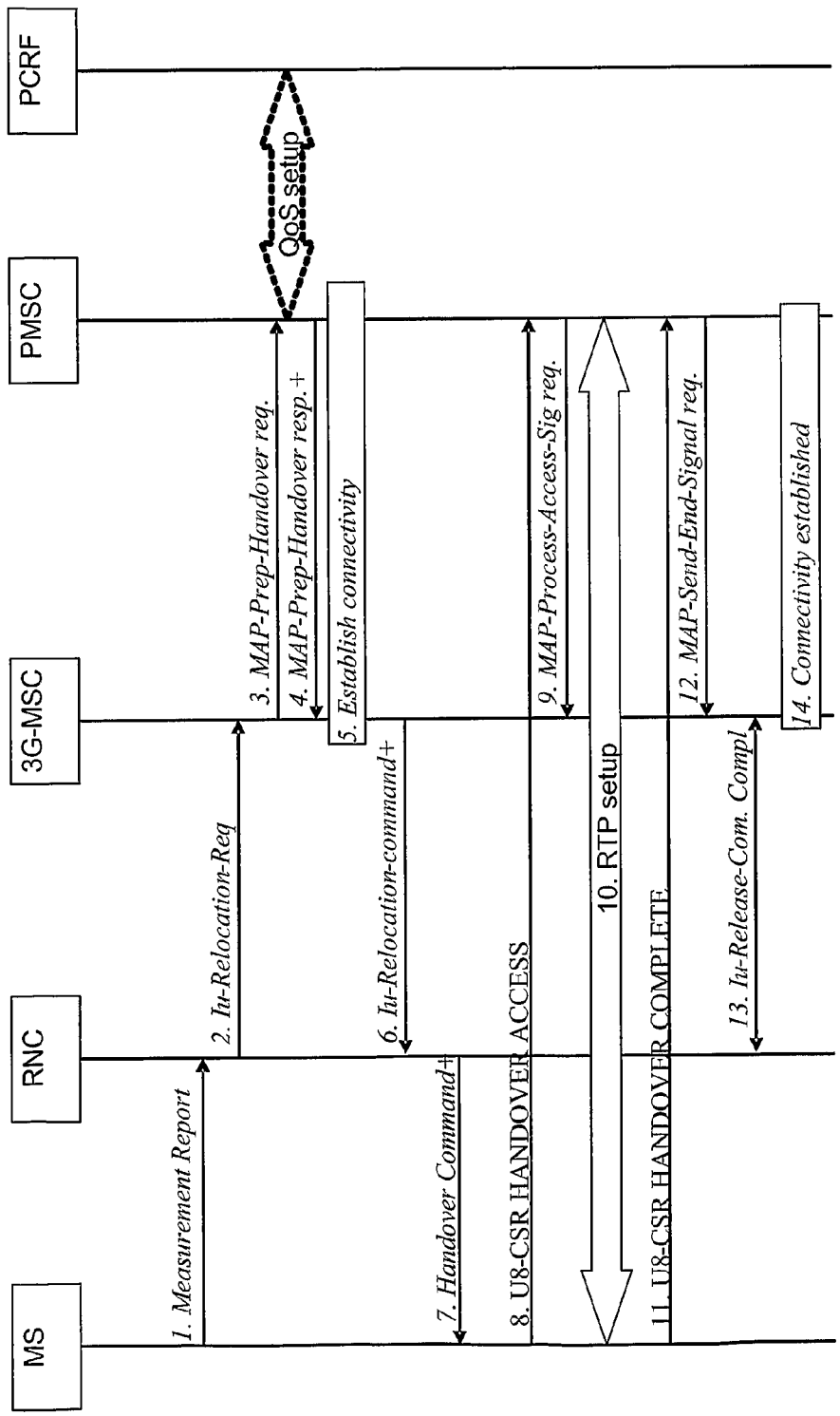
FIGS. 17 and 18 illustrate handovers between 24.008 over 3GPP PS network mode and CS Domain mode according to embodiments of the present invention.
Figure 18:
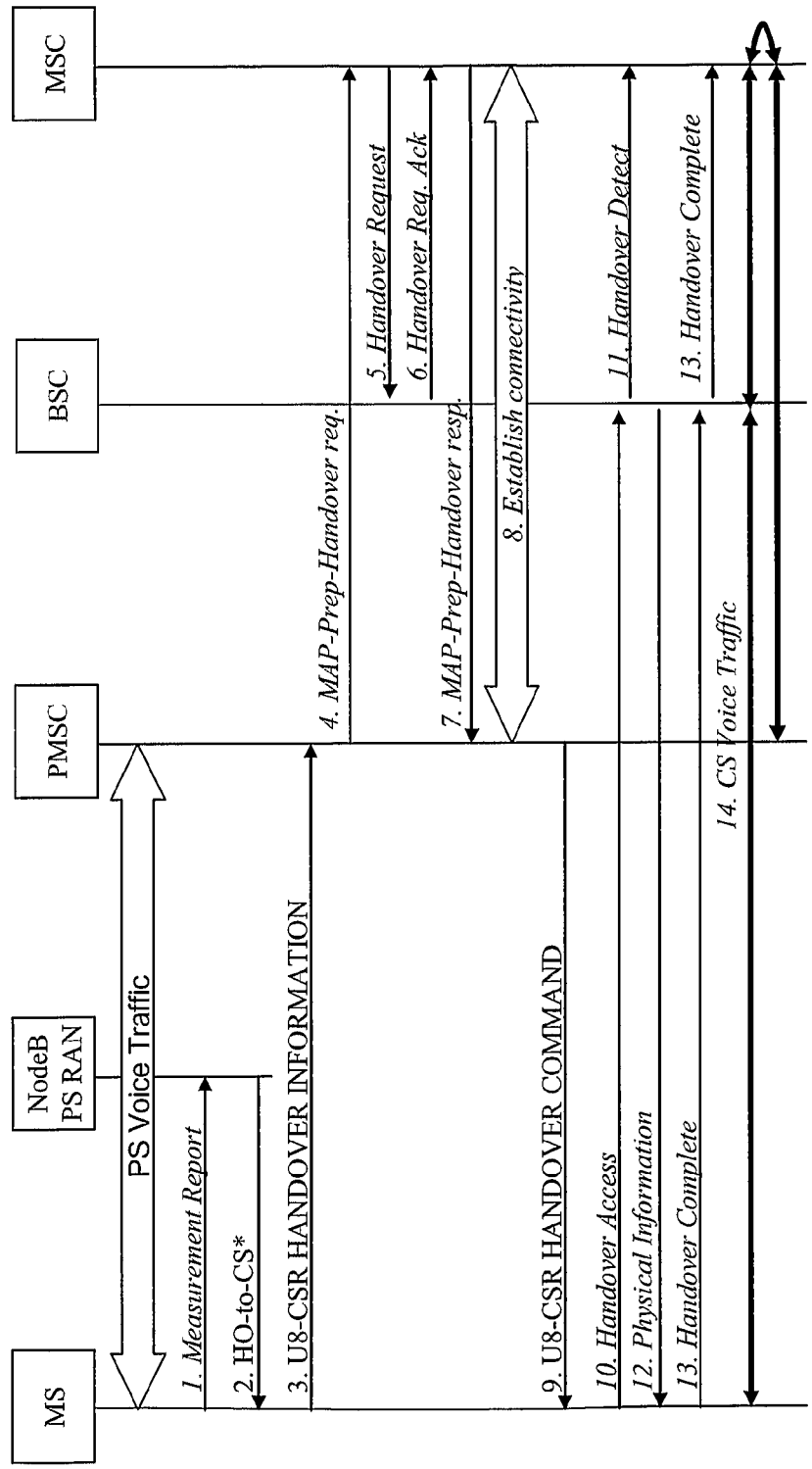

6. The CN triggers the release of connection as described in FIG. 14. FIGS. 17 and 18 illustrate handovers between 24.008 over 3GPP PS network mode and CS Domain mode. FIG. 17 illustrates handover from CS access to 24.008 over 3GPP PS network. FIGS. 17 and 18 contain exemplary message names for example for the signaling between the UTRAN (RNC) and the MSC in FIG. 17 or for the signaling between GERAN (BSC) and the MSC in FIG. 18. The exact message names depend on the type of the RAN, for example UTRAN or GERAN. The description of the handover to 24.008 over 3GPP PS network procedure assumes that the MS is on an active CS call on UTRAN (or GERAN); and 1. The MS begins to include measurements made on neighboring cells, these cells might be PS-only cells.

2. Based on MS measurement reports and the internal algorithms, UTRAN(/GERAN) decides to handover to a PS cell using the 24.008 over 3GPP PS network service, however the UTRAN(GERAN) is unaware that the target cell is a PS cell. The UTRAN(/GERAN) starts the handover preparation by sending a Relocation required message to the MSC (in GERAN the message would be called Handover required), identifying the target (24.008 over 3GPP PS network) cell.

3. The MSC requests the target 24.008 over 3GPP PS network PMSC to allocate resources for the handover, using MAP-Prep-Handover request message. The target PMSC is selected based on configuration in the anchor MSC, where the target cell id is used to point out the target PMSC.

4. The target 24.008 over 3GPP PS network supporting PMSC acknowledges the handover request, using MAP-Prep-Handover response, indicating it can support the requested handover. The PMSC will include an indication that this is a CS to PS handover. It may also include IP address and UDP port at the PMSC side needed for the voice session, this to minimize the silence time when the actual handover takes place.

5. The MSC and PMSC establish connectivity between each other. If ISUP is used MSC starts with an IAM to the PMSC.

6. MSC sends RELOCATION COMMAND to the UTRAN (in the GERAN case the message would be called Handover command), to commence the handover. Included is the indication of CS to PS handover and potentially also the IP address and UDP port, as provided in step 4 above.

7. UTRAN(/GERAN) sends for example a "Handover Command" message to the MS to initiate handover to 24.008 over 3GPP PS network. The exact message name depends on both the source and the target RAN types. The Handover Command includes PS handover parameters. Included is the indication of CS to PS handover and potentially also the IP address and UDP port, as provided in step 6.

8. The MS accesses the 24.008 over 3GPP PS network supporting PMSC using the U8-CSR HANDOVER ACCESS message. The handover reference in the handover command allows the 24.008 over 3GPP PS network supporting PMSC to correlate the handover.

9. Upon receipt of U8-CSR HANDOVER ACCESS, the PMSC will forward it to the MSC using the MAP-Process-Access-Signaling request message.

10. The 24.008 over 3GPP PS network supporting PMSC sets up the bearer path with the MS, using the same steps as in steps 7 to 13 of Mobile Originated Call Flow as defined in FIG. 8. If IP address and UDP to the PMSC has already been provided, only the steps where the MS provides its IP address and UDP port for the RTP stream is done. This step may start in parallel to step 9.

11. The MS transmits the U8-CSR HANDOVER COMPLETE to indicate the completion of the handover procedure at its end. It switches the user from the UTRAN(/GERAN) user plane to the 24.008 over 3GPP PS network user plane. This must already have been done in step 9.

12. The U8-CSR HANDOVER COMPLETE is forwarded to the MSC using the MAP-Send-End-Signaling request message. Bi-directional voice traffic is now flowing over 3GPP PS network.

13. The MSC can now tear down the connection to the source UTRAN(/GERAN), using RELEASE-COMMAND, the UTRAN(/GERAN) acknowledge with RELEASE-COMPLETE.

14. The PMSC will indicate the MSC that connectivity has been established, e.g. if ISUP is used the ANM message will be sent.

FIG. 18 illustrates handover from 24.008 over 3GPP PS network to GERAN. This procedure assumes that the MS is on an active call on the 24.008 over 3GPP PS network; and 1. The MS send in the measurement report to the eNodeB.
2. At this point there are 3 different solution proposals:
a) The LTE eNodeB determines that this should be handed over to CS. It makes this decision based on bearer types and configured data. It then sends a HO-to-CS command to the MS;
b) The LTE eNodeB issues a PS handover to GERAN. When the handover is complete, the SGSN will directly issue a HO-to-CS command to the MS. The decision to do so is based on bearer type and configured data; or
c) No PS to CS handover is at all triggered by the network. This means that the MS can use its local measurements or received TRAP reports, to decide to initiate the handover procedure.
3. The MS sends the U8-CSR HANDOVER INFORMATION message to the 24.008 over 3GPP PS network supporting PMSC indicating the Channel Mode and a list of target GERAN cells and/or target UTRAN cells, identified by CGI or other unique cell identifiers needed for the triggering of the handover, in order of preference (e.g. ranked by C1 path loss parameter) for handover, and includes the received signal strength for each identified UTRAN/GERAN cell. This list is the information received in step 2 a) and b) above.

If 2 c) is chosen, the MS must at some intervals read the System Information in GERAN and UTRAN, so that the needed information about cell identifiers can be provided in the U8-CSR HANDOVER INFORMATION.

4-8. Standard Inter MSC handover procedures.

9. 24.008 over 3GPP PS network supporting PMSC transmits the U8-CSR HANDOVER COMMAND to the MS including the details sent by GERAN (or UTRAN) on the target resource allocation.

10-15 Standard Inter MSC handover procedures.

24.008 over 3GPP PS network provides also support for Circuit Switched SMS services. GSM SMS support in 24.008 over 3GPP PS network is based on the same mechanism that is utilized for GSM mobility management and call control. On the MS side, the SMS layers (including the supporting CM sub layer functions) utilize the services of the MM layer to transfer SMS messages per standard circuit switched GSM implementation. The SM-CP protocol is effectively tunneled between the MS and the 24.008 over 3GPP PS network supporting PMSC, using U8-CSR messages.

UMTS/GSM has a large number of standardized supplementary services. These supplementary services involve procedures that operate end-to-end between the MS and the PMSC (and MSC). The messages used for the supplementary service are relayed between the MS and PMSC in the same manner as in the other call control and mobility management scenarios described in this document.

What is claimed is:

1. A method of establishing a mobile originated call from a mobile station operating in a Long Term Evolution, LTE, radio access network, said method comprising the steps of:
establishing an interface between the mobile station and a Packet Mobile Switching Center, PMSC, over a packet switched network utilizing U8 Circuit Switched Resources, U8-CSR, protocol signaling;
receiving in the PMSC, a U8-CSR service request from the mobile station;
sending a Diameter AA-Request message from the PMSC to a Policy and Charging Rules Function, PCRF, requesting packet switched domain resources for the call;
receiving in the PMSC, an AA-Answer message from the PCRF including terminating user plane addresses for a User Datagram Protocol, UDP, port and a network endpoint to be utilized for an uplink user plane Real Time Protocol, RTP, stream from the mobile station;
establishing by the PMSC, a voice bearer channel between the mobile station and the network endpoint for transporting uplink and downlink user plane RTP streams; and
facilitating by the PMSC, bidirectional voice traffic between the mobile station and the network endpoint.

2. The method of claim 1, wherein the step of establishing a voice bearer channel comprises:
sending a U8-CSR ACTIVATE CHANNEL message from the PMSC to the mobile station;
receiving in the PMSC, the uplink user plane RTP stream from the mobile station;
receiving in the PMSC, a U8-CSR ACTIVATE CHANNEL ACK message from the mobile station; and
sending from the PMSC to the mobile station, the downlink user plane RTP stream.

3. The method of claim 2, wherein the U8-CSR ACTIVATE CHANNEL message includes bearer path setup information.

4. The method of claim 3, wherein the bearer path setup information comprises at least one of a channel mode, a Multi-rate codec configuration, the UDP port address, an IP address for a media gateway for receiving the uplink user plane RTP stream, and a voice sample size.

5. The method of claim 1, further comprising authenticating the mobile station by the PMSC.

6. The method of claim 1, further comprising initiating a Ciphering Configuration procedure by the PMSC.

7. The method of claim 1, further comprising modifying the voice bearer channel between the mobile station and the network endpoint, said modifying step including:
- sending a second Diameter AA-Request message from the PMSC to the PCRF requesting a modification of the voice channel bearer;
- receiving in the PMSC, a second AA-Answer message from the PCRF including modified parameters for the voice channel bearer; and
- sending from the PMSC to the mobile station, a U8-CSR CHANNEL MODE MOFIFY message to modify parameters for the voice channel bearer.

8. A method of establishing a mobile terminated call to a mobile station operating in a Long Term Evolution, LTE, radio access network, said method comprising the steps of:
- establishing an interface between the mobile station and a Packet Mobile Switching Center, PMSC, over a packet switched network utilizing U8 Circuit Switched Resources, U8-CSR, protocol signaling;
- sending by the PMSC, a U8-CSR PAGING REQUEST message to the mobile station notifying the mobile station of an incoming call;
- sending a Diameter AA-Request message from the PMSC to a Policy and Charging Rules Function, PCRF, requesting packet switched domain resources for the call;
- receiving in the PMSC, an AA-Answer message from the PCRF including terminating user plane addresses for a User Datagram Protocol, UDP, port and a network endpoint to be utilized for an uplink user plane Real Time Protocol, RTP, stream from the mobile station;
- establishing by the PMSC, a voice bearer channel between the mobile station and the network endpoint for transporting uplink and downlink user plane RTP streams;
- alerting and connecting the mobile station by the PMSC; and
- facilitating by the PMSC, bidirectional voice traffic between the mobile station and the network endpoint.

9. The method of claim 8, wherein, in response to the U8-CSR PAGING REQUEST, the PMSC receives a U8-CSR PAGING RESPONSE message from the mobile station.

10. The method of claim 9, wherein the U8-CSR PAGING RESPONSE includes a mobile station classmark and ciphering key sequence number.

11. The method of claim 8, further comprising authenticating the mobile station by the PMSC.

12. The method of claim 8, further comprising initiating a Ciphering Configuration procedure by the PMSC.

13. The method of claim 8, further comprising modifying the voice bearer channel between the mobile station and the network endpoint, said modifying step including:
- sending a second Diameter AA-Request message from the PMSC to the PCRF requesting a modification of the voice channel bearer;
- receiving in the PMSC, a second AA-Answer message from the PCRF including modified parameters for the voice channel bearer; and
- sending from the PMSC to the mobile station, a U8-CSR CHANNEL MODE MOFIFY message to modify parameters for the voice channel bearer.

14. A Packet Mobile Switching Center, PMSC, for establishing calls to and from a mobile station operating in a Long Term Evolution, LTE, radio access network, said PMSC comprising:
- U8 Circuit Switched Resources, U8-CSR, protocol signaling means for establishing an interface with the mobile station over a packet switched network;
- Diameter AA protocol signaling means for obtaining packet switched domain resources for the call from a Policy and Charging Rules Function, PCRF;
- means for establishing a voice bearer channel between the mobile station and a network endpoint for transporting uplink and downlink user plane Real Time Protocol, RTP, streams;
- means for facilitating bidirectional voice traffic between the mobile station and the network endpoint;
- and wherein the Diameter AA protocol signaling means includes: means for sending a Diameter AA-Request message to the PCRF requesting packet switched domain resources for the call; and means for receiving an AA-Answer message from the PCRF including terminating user plane addresses for a User Datagram Protocol, UDP, port and the network endpoint to be utilized for the uplink user plane RTP stream from the mobile station.

15. The PMSC of claim 14, wherein the U8-CSR protocol signaling means includes means for establishing the interface with the mobile station for handling a mobile originated call from the mobile station.

16. The PMSC of claim 14, wherein the U8-CSR protocol signaling means includes means for establishing the interface with the mobile station for handling a mobile terminated call to the mobile station.

* * * * *

UNITED STATES PATENT AND TRADEMARK OFFICE
CERTIFICATE OF CORRECTION

PATENT NO. : 8,165,574 B2  
APPLICATION NO. : 12/522208  
DATED : April 24, 2012  
INVENTOR(S) : Hallenstal et al.

It is certified that error appears in the above-identified patent and that said Letters Patent is hereby corrected as shown below:

On the Title Page, in Item (73), under "Assignee", in Column 1, Line 1, delete "Ericsson," and insert -- Ericsson (publ), --, therefor.

On the Title Page, in the Figure, for Tag "198", in Line 1, delete "cs-MGW" and insert -- CS-MGW --, therefor.

On the Title Page, in Item (56), under "OTHER PUBLICATIONS", in Column 2, Line 4, delete "URL:http:" and insert -- URL: http: --, therefor.

On the Title Page, in Item (56), under "OTHER PUBLICATIONS", in Column 2, Line 4, delete "1nfo/" and insert -- info/ --, therefor.

On Title Page 2, in Item (56), under "OTHER PUBLICATIONS", in Column 1, Line 2, delete "Aspects:" and insert -- Aspects; --, therefor.

On Title Page 2, in Item (56), under "OTHER PUBLICATIONS", in Column 1, Line 4, delete "(3GPP), Technicalspecification" and insert -- (3GPP): Technical Specification --, therefor.

On Title Page 2, in Item (56), under "OTHER PUBLICATIONS", in Column 1, Line 5, delete "No. v7.1.0." and insert -- no. v7.1.0, --, therefor.

On Title Page 2, in Item (56), under "OTHER PUBLICATIONS", in Column 1, Lines 5-6, delete "4.3.6.1.5.62.1, 7.2, 7.4" and insert -- 4.3, 6.1.5, 6.2.1, 7.2, 7.4, --, therefor.

On Title Page 2, in Item (56), under "OTHER PUBLICATIONS", in Column 1, Line 9, delete "Report." and insert -- Report, --, therefor.

On Title Page 2, in Item (56), under "OTHER PUBLICATIONS", in Column 1, Line 11, delete "inf 0/23882" and insert -- info/23882 --, therefor.

Signed and Sealed this  
Eleventh Day of June, 2013

Teresa Stanek Rea  
*Acting Director of the United States Patent and Trademark Office*

On Title Page 2, in Item (56), under "OTHER PUBLICATIONS", in Column 1, Line 12, delete "7.5.2.1 1," and insert -- 7.5.2.1.1, --, therefor.

On Title Page 2, in Item (56), under "OTHER PUBLICATIONS", in Column 1, Line 12-13, delete "7.12.2,7.12.3," and insert -- 7.12.2, 7.12.3, --, therefor.

On Title Page 2, in Item (56), under "OTHER PUBLICATIONS", in Column 2, Line 1, delete "(Phase 24+);" and insert -- (Phase 2+); --, therefor.

On Title Page 2, in Item (56), under "OTHER PUBLICATIONS", in Column 2, Line 2, delete "43.902" and insert -- 43.902, --, therefor.

On Title Page 2, in Item (56), under "OTHER PUBLICATIONS", in Column 2, Line 3, delete "Standards." and insert -- Standards, --, therefor.

On Title Page 2, in Item (56), under "OTHER PUBLICATIONS", in Column 2, Line 4, delete "No." and insert -- no. --, therefor.

On Title Page 2, in Item (56), under "OTHER PUBLICATIONS", in Column 2, Line 4, delete "0000-0001" and insert -- 0000-0001, --, therefor.

On Title Page 2, in Item (56), under "OTHER PUBLICATIONS", in Column 2, Line 5, delete "117" and insert -- 117, --, therefor.

On Title Page 2, in Item (56), under "OTHER PUBLICATIONS", in Column 2, Line 7, delete "access"." and insert -- access", --, therefor.

On Title Page 2, in Item (56), under "OTHER PUBLICATIONS", in Column 2, Line 10, delete "inf.0/23879" and insert -- info/23879 --, therefor.

On Title Page 2, in Item (56), under "OTHER PUBLICATIONS", in Column 2, Line 11, delete "MSC" and insert -- MSC, --, therefor.

In the Drawings:

In Fig. 1, Sheet 1 of 18, for Tag "198", in Line 1, delete "cs-MGW" and insert -- CS-MGW --, therefor.

In Fig. 12, Sheet 12 of 18, for Point "4", in Line 1, delete "U8 -CSR" and insert -- U8-CSR --, therefor.

In Fig. 12, Sheet 12 of 18, for Point "5", in Line 1, delete "U8 -CSR" and insert -- U8-CSR --, therefor.

In Fig. 17, Sheet 17 of 18, for Point "13", in Line 1, delete "Compl" and insert -- Compl. --, therefor.

In the Specifications:

In Column 3, Line 54, delete "identically)" and insert -- identically). --, therefor.

In Column 5, Line 2, delete "Network" and insert -- Network. --, therefor.

In Column 9, Line 7, delete "mayl" and insert -- may --, therefor.

In Column 9, Line 16, delete "network" and insert -- network. --, therefor.

In Column 9, Line 50, delete "embodiment," and insert -- embodiment. --, therefor.

In Column 10, Line 67, delete "FIG." and insert -- FIGS. --, therefor.

In Column 13, Line 59, delete "TRAP reports," and insert -- RTCP reports, --, therefor.

In the Claims:

In Column 14, Line 33, in Claim 1, delete "Evolution, LTE," and insert -- Evolution (LTE), --, therefor.

In Column 14, Line 36, in Claim 1, delete "Center, PMSC," and insert -- Center (PMSC), --, therefor.

In Column 14, Line 38, in Claim 1, delete "Resources, U8-CSR," and insert -- Resources (U8-CSR), --, therefor.

In Column 14, Line 42, in Claim 1, delete "Function, PCRF," and insert -- Function (PCRF), --, therefor.

In Column 14, Line 47, in Claim 1, delete "Protocol, UDP," and insert -- Protocol (UDP), --, therefor.

In Column 14, Line 49, in Claim 1, delete "Protocol, RTP," and insert -- Protocol (RTP), --, therefor.

In Column 15, Line 20, in Claim 7, delete "MOFIFY" and insert -- MODIFY --, therefor.

In Column 15, Line 23, in Claim 8, delete "Evolution, LTE," and insert -- Evolution (LTE), --, therefor.

CERTIFICATE OF CORRECTION (continued)
U.S. Pat. No. 8,165,574 B2

In Column 15, Line 26, in Claim 8, delete "Center, PMSC," and insert -- Center (PMSC), --, therefor.

In Column 15, Line 28, in Claim 8, delete "Resources, U8-CSR," and insert -- Resources (U8-CSR), --, therefor.

In Column 15, Line 33, in Claim 8, delete "Function, PCRF," and insert -- Function (PCRF), --, therefor.

In Column 15, Line 38, in Claim 8, delete "Protocol, UDP," and insert -- Protocol (UDP), --, therefor.

In Column 15, Line 40, in Claim 8, delete "Protocol, RTP," and insert -- Protocol (RTP), --, therefor.

In Column 16, Line 16, in Claim 13, delete "MOFIFY" and insert -- MODIFY --, therefor.

In Column 16, Line 18, in Claim 14, delete "Center, PMSC," and insert -- Center (PMSC), --, therefor.

In Column 16, Line 20, in Claim 14, delete "Evolution, LTE," and insert -- Evolution (LTE), --, therefor.

In Column 16, Line 22, in Claim 14, delete "Resources, U8-CSR," and insert -- Resources (U8-CSR), --, therefor.

In Column 16, Line 27, in Claim 14, delete "Function, PCRF;" and insert -- Function (PCRF); --, therefor.

In Column 16, Lines 30-31, in Claim 14, delete "Protocol, RTP," and insert -- Protocol (RTP), --, therefor.

In Column 16, Lines 39-40, in Claim 14, delete "Protocol, UDP," and insert -- Protocol (UDP), --, therefor.